United States Patent (10) Patent No.: US 12,189,956 B2
Doni Gurudath et al. (45) Date of Patent: Jan. 7, 2025

(54) OPTIMIZED SSD FOR GAME LOADING AND RENDERING

(71) Applicant: Western Digital Technologies, Inc., San Jose, CA (US)

(72) Inventors: Bhanushankar Doni Gurudath, Karnataka (IN); Raghavendra Gopalakrishnan, Karnataka (IN)

(73) Assignee: SANDISK TECHNOLOGIES, INC., Milpitas, CA (US)

(*) Notice: Subject to any disclaimer, the term of this patent is extended or adjusted under 35 U.S.C. 154(b) by 6 days.

(21) Appl. No.: 18/349,891

(22) Filed: Jul. 10, 2023

(65) Prior Publication Data

US 2024/0220116 A1 Jul. 4, 2024

Related U.S. Application Data

(60) Provisional application No. 63/478,054, filed on Dec. 30, 2022.

(51) Int. Cl.
G06F 3/06 (2006.01)
A63F 13/95 (2014.01)
G06F 12/1009 (2016.01)

(52) U.S. Cl.
CPC ............ *G06F 3/0611* (2013.01); *A63F 13/95* (2014.09); *G06F 3/0656* (2013.01); *G06F 3/0679* (2013.01); *G06F 12/1009* (2013.01)

(58) Field of Classification Search
CPC .... G06F 3/0611; G06F 3/0659; G06F 3/0679; G06F 3/0656; G06F 3/061;

(Continued)

(56) References Cited

U.S. PATENT DOCUMENTS 7,173,863 B2 2/2007 Conley et al.
2017/0052736 A1* 2/2017 Butt ...................... G06F 3/0619
(Continued)

FOREIGN PATENT DOCUMENTS

WO 2017/049583 3/2017

OTHER PUBLICATIONS

Shai Bergman, Tanya et al. SPIN: Seamless Operating System Integration of Peer-to-Peer DMA Between SSDs and GPUs; Apr. 2019.

(Continued)

*Primary Examiner* — Tracy C Chan
(74) *Attorney, Agent, or Firm* — ARENTFOX SCHIFF LLP

(57) ABSTRACT

Aspects are provided for optimizing game loading and rendering using an RMB dedicated for predicted host data that is accessible to a host and to a controller of a storage device. The controller obtains a bitmap indicating a status of a buffer in the RMB, receives from the host a read command indicating a logical address, predicts and reads from an NVM host data associated with a predicted logical address that is subsequent to the logical address, and loads the host data in the buffer in the RMB if the buffer is free. Subsequent read commands indicating the predicted logical address may lack PRP addresses in response to the host data being loaded in the RMB, while completion queue elements in response to such commands may include PRP addresses in the RMB where the host data is stored. Thus, command creation and completion overhead may be reduced using the RMB.

20 Claims, 11 Drawing Sheets

(58) Field of Classification Search
CPC ............ G06F 12/1009; G06F 12/0246; G06F 2212/7203; G06F 2212/7201; A63F 13/95
See application file for complete search history.

(56) References Cited

U.S. PATENT DOCUMENTS

| | | | |
|---|---|---|---|
| 2018/0024738 A1 | 1/2018 | Ngu | |
| 2019/0012114 A1* | 1/2019 | Spencer | G06F 12/0866 |
| 2020/0201571 A1* | 6/2020 | Jung | G06F 12/0862 |
| 2021/0240389 A1* | 8/2021 | Sela | G06F 12/1408 |
| 2022/0058116 A1* | 2/2022 | Kim | G06F 12/0873 |

OTHER PUBLICATIONS

Pak Markthub et al. DRAGON: Breaking GPU Memory Capacity Limits with Direct NVM Access; Nov. 11-16, 2018.
Tanya Brokhman et al. GAIA: An OS Page Cache for Heterogeneous Systems; Jul. 10-12, 2019.
International Search Report and Written Opinion issued in International Application No. PCT/US2023/077264, mailed Feb. 14, 2024, 7 pages.

* cited by examiner

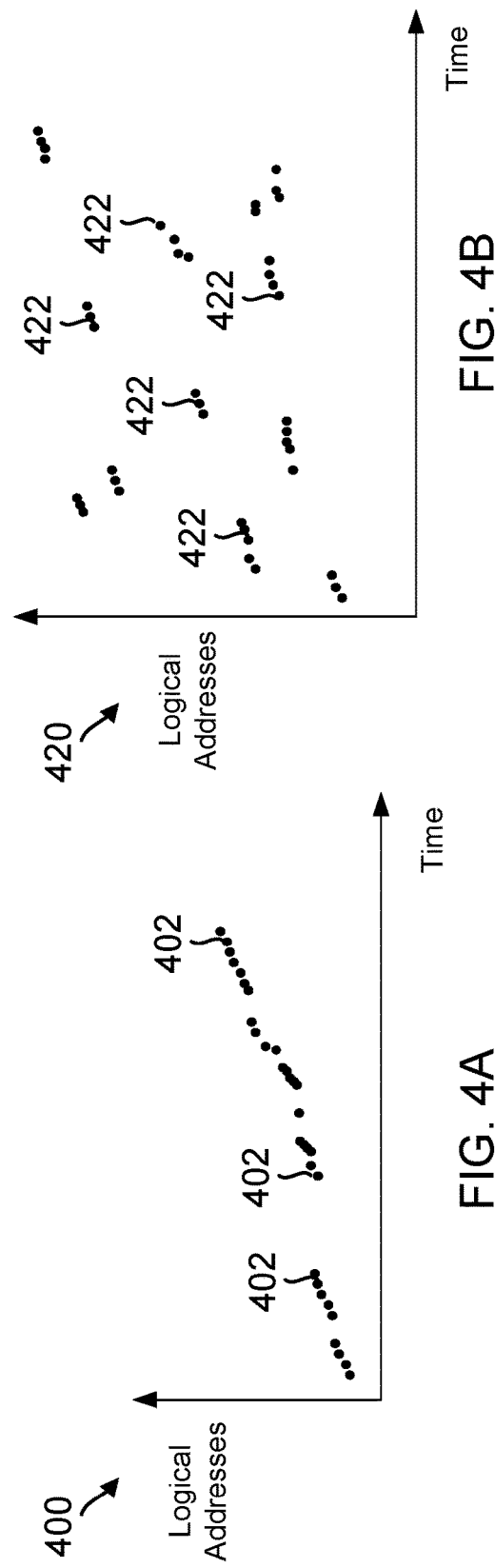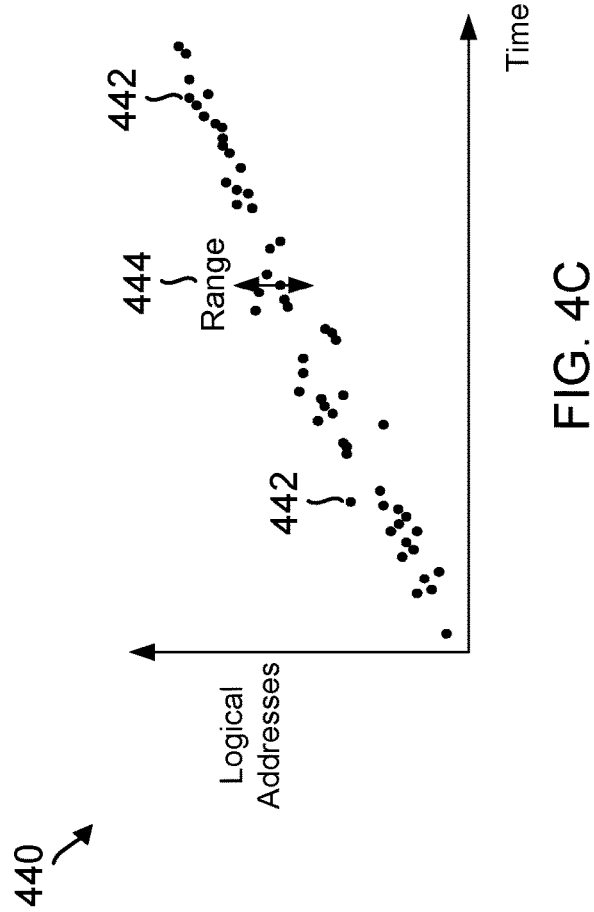
FIG. 4A
FIG. 4B
FIG. 4C

OPTIMIZED SSD FOR GAME LOADING AND RENDERING

CROSS REFERENCE TO RELATED APPLICATION(S)

This application claims the benefit of U.S. Provisional Application No. 63/478,054, entitled "OPTIMIZED SSD FOR GAME LOADING AND RENDERING" and filed on Dec. 30, 2022, the disclosure of which is expressly incorporated by reference herein in its entirety.

BACKGROUND

Field

This disclosure is generally related to electronic devices and more particularly to storage devices.

Introduction

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

One type of data that a flash storage device may store is game data, or data associated with a gaming application. When game data such as textures or other game assets are required to render a scene, a host may read the data from the storage device and load the data into shared or accessible host memory between a central processing unit (CPU) of a host and a graphics processing unit (GPU) of the host. The workload involved in loading game data has evolved over time. For instance, hosts now tend to load larger amounts of game data in the shared memory when running modern games than was previously done for older games. This workload also tends to be handled more intelligently or efficiently than before. For example, instead of loading large chunks of game data at a time in memory using a few, large size input/output (I/O) requests, this data may be broken down into smaller pieces and loaded in memory using smaller size I/O commands when needed (e.g., to render a current scene).

While this approach of breaking a large command down into numerous, smaller I/O requests is more memory-efficient and can deliver improved rendering of scenes, the host may end up generating many more I/O requests as a result, creating significant overhead in preparing, completing, and processing these requests. Moreover, although non-volatile memory express (NVMe) bandwidths have increased over time, current storage application programming interfaces (APIs) are not optimized for large numbers of I/O requests, preventing these APIs from scaling up to these larger NVMe bandwidths and thus creating bottlenecks that limit the loading and thus rendering speed of scenes in a game. Even with fast hardware available at the host to interface with a flash storage device using NVMe protocols, games using existing storage APIs may not be able to fully saturate the I/O pipeline expected at the host, leaving valuable bandwidth in the flash storage device unable to be used.

SUMMARY

One aspect of a storage device is disclosed herein. The storage device includes non-volatile memory and a controller. The controller is configured to receive from a host a read command indicating a logical address, read host data associated with a predicted logical address that is subsequent to the logical address from the non-volatile memory in response to the read command, and load the host data in a memory buffer in host volatile memory that is accessible to the host and to the controller. The memory buffer is dedicated for predicted host data. The controller is also configured to subsequently receive from the host a subsequent read command indicating the predicted logical address, the subsequent read command lacking an address of a physical region page (PRP) specified in the read command for data transfer in response to the host data being loaded in the memory buffer.

Another aspect of a storage device is disclosed herein. The storage device includes non-volatile memory and a controller. The controller is configured to obtain a bitmap indicating a status of a buffer in a memory buffer in host volatile memory, where the memory buffer is accessible to a host and to the controller and is dedicated for predicted host data. The controller is also configured to predict, in response to a read command from the host indicating a logical address, a subsequent logical address to the logical address, read host data at the subsequent logical address from the non-volatile memory, and load the host data in the buffer in the memory buffer in response to the bitmap indicating the buffer is free.

A further aspect of a storage device is disclosed herein. The storage device includes non-volatile memory and a controller. The controller is configured to obtain a bitmap indicating a status of a buffer in a memory buffer in host volatile memory that is accessible to a host and to the controller, where the memory buffer is dedicated for predicted host data. The controller is further configured to receive from the host a vendor-specific read command indicating a logical address, read host data associated with a predicted logical address that is subsequent to the logical address from the non-volatile memory in response to the vendor-specific read command, and load the host data in the buffer in the memory buffer in response to the bitmap indicating the buffer is free.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein:

FIGS. 4A-4C are graphical diagrams illustrating different examples of sequential data workloads in the storage device of FIG. 1.

DETAILED DESCRIPTION

Figure 1:
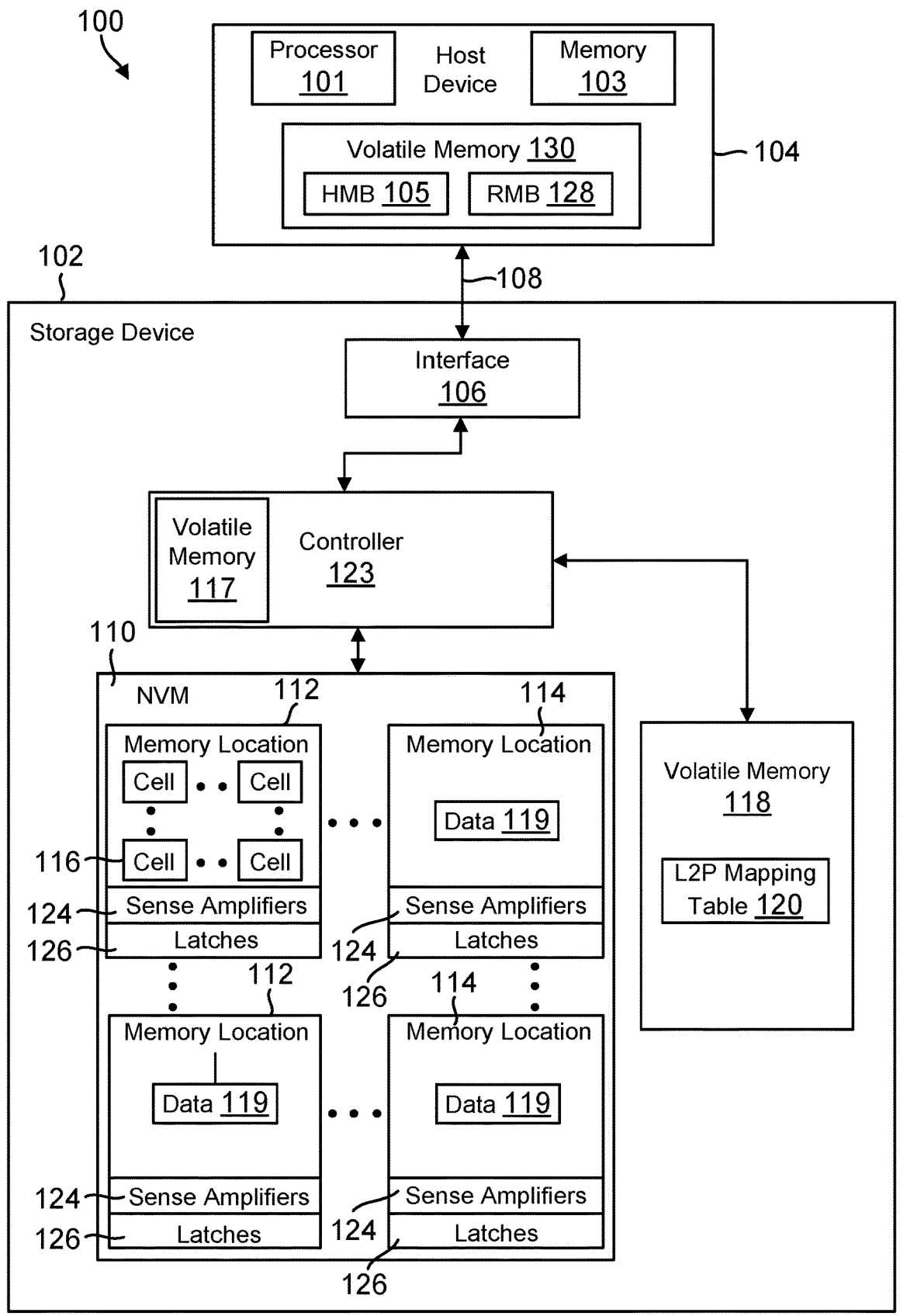
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

A host may issue I/O requests such as read commands to read game data from a storage device and load the data into host memory. The host may issue each request to the storage device, for example, using an application program interface (API). Previously, APIs were configured such that a host application (e.g., a game) manages and handles each of these I/O requests individually at a time, and first by submitting the request, waiting for it to complete, and then handling its completion. For older games running on slower hard drives, the overhead of each request was not very large and generally was not a bottleneck for the system. However, as processing speeds and storage device bandwidths have increased significantly over time (e.g., multiplied by tens of thousands of times per second), total I/O overhead can quickly become too expensive, preventing more modern games from being able to take advantage of increased storage device bandwidths.

In attempt to efficiently address today's evolution in storage bandwidths and I/O workflows for game data, certain application programming interfaces (APIs) have been developed with the goal of maximizing performance in pipelining of data between an NVMe storage device and a graphics processing unit (GPU) of a host. For example, such APIs may reduce the overhead of individual NVMe I/O requests by segmenting large commands into multiple, smaller I/O commands, batching multiple I/O requests so that read data may be efficiently communicated to and decompressed by the GPU, and providing more flexible control to gaming applications regarding when to obtain notifications of completions of I/O requests. Thus, these APIs aim to promote faster, near-instant loading times for games by minimizing or eliminating data streaming overhead in systems with NVMe storage devices.

However, while such APIs intend to maximize performance through reduced command processing overhead, these APIs still result in command creation and completion overhead. For example, notwithstanding the segmenting, batching, and controlling completion notification of various read commands to the storage device, a host may still end up creating and a storage device may still end up processing completion of numerous read commands to read data from the storage device and load the data in host memory to be decompressed by a GPU into a single frame to be rendered in a game. Therefore, it would be helpful if this additional overhead in host creation and completion processing of read commands to a storage device could be reduced or avoided so that the GPU may efficiently and quickly access game data (or other data) from the storage device with minimized latency.

Accordingly, aspects of the present disclosure provide a storage device which may load predicted game data (or other predicted data than game data based on previous host commands) in a read look ahead (RLA) memory buffer (RMB) that is dedicated for such predicted data in host volatile memory. In RLA, a controller of the storage device may predict data stored at logical addresses that the controller expects to be indicated in future read command from the host. For example, the controller may receive one or more read commands indicating logical addresses of requested data, and in addition to reading the requested data at these logical addresses and loading it in host volatile memory, the controller may predict one or more next or subsequent logical addresses to these logical addresses, read this data before actually receiving a read command for such data (e.g., RLA), and load this data in an RMB dedicated for such RLA data in the host volatile memory. As an example, if the controller receives read commands for data stored at logical addresses 0, 1, 2, 3, and 4, the controller may predict from the sequential logical address pattern that a next or subsequent read command would continue the pattern and thus request data stored at logical address 5. If the host later intends to use data that happens to be present in the RMB (e.g., in rendering a scene in a game), the host may read the RLA data from the RMB without being required to send a read command to the storage device initially to obtain this data from its non-volatile memory, thereby saving time and avoiding the overhead involved in creating and processing completion of such read command (since no read command is sent for RLA data).

Here, the controller allocates the RMB in volatile memory in the host, such as in host dynamic random access memory (DRAM), rather than allocating the RMB in volatile memory in the storage device, such as in controller static random access memory (SRAM), since compared to host DRAM the controller SRAM may be more limited or restrictive in size, more costly to extend, and thus more prone to bottlenecks in gaming data workloads with short bursts of variably-sized reads. Moreover, the controller utilizes an RMB in the host volatile memory for RLA data, rather than a host memory buffer (HMB) in the host volatile memory for this purpose, since HMBs are inaccessible to the host (they are dedicated for storage device access only) while the RMB is intended to be accessible by both the storage device and the host. The controller may therefore request the host to allocate an RMB in a small portion of its system (host) random access memory to serve as an extended pre-loading space, which is accessible by both the host and controller in contrast to an HMB, for game data or other data that the controller (or even the host) may predict to be read in the future based on a given workload. The allocation request may be sent in response to a gaming mode being enabled (e.g., through a command from the host to the controller), or in response to some other mode, command, or trigger. In this way, load times of host data may be reduced due to there being less I/O requests from the host to the storage device as a result of there being RLA data in the RMB, thus improving user experience for example through faster scene switching times in gaming applications.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102. Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU) or a graphics processing unit (GPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host 104 may also include a host memory buffer (HMB 105). The HMB 105 is a portion of host memory (e.g., host memory 103 or a different memory in host 104, such as host volatile memory 130) that the host 104 may allocate to the storage device 102 to utilize for the storage device's own purposes. For instance, the storage device 102 may utilize the HMB 105 as an address mapping table cache or a data cache. In some examples, the HMB 105 may include volatile memory, such as RAM, DRAM, or SDRAM (e.g., DDR1, DDR2, DDR3, DDR3L, LPDDR3, DDR4, and the like). In other examples, the HMB 105 may include non-volatile memory (in which case HMB 105 may not be in host volatile memory 130).

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of NVM memory locations 112 which may store system data for operating the storage device 102 or user data received from the host for storage in the storage device 102. For example, the NVM may have a cross-point architecture including a 2-D NAND array of NVM memory locations 112 having n rows and m columns, where m and n are predefined according to the size of the NVM. In the exemplary embodiment of FIG. 1, each NVM memory location 112 may be a die 114 including multiple planes each including multiple blocks of multiple cells 116. Alternatively, each NVM memory location 112 may be a plane including multiple blocks of the cells 116. The cells 116 may be single-level cells, multi-level cells, triple-level cells, quad-level cells, and/or penta-level cells, for example. Other examples of NVM memory locations 112 are possible; for instance, each NVM memory location may be a block or group of blocks. Each NVM memory location may include one or more blocks in a 3-D NAND array. Each NVM memory location 112 may include one or more logical blocks which are mapped to one or more physical blocks. Alternatively, the memory and each NVM memory location may be implemented in other ways known to those skilled in the art. The storage device 102 also includes one or more volatile memories 117, 118 that can, for example, include a Dynamic Random Access Memory (DRAM) or a Static Random Access Memory (SRAM). For example, as illustrated in FIG. 1, volatile memory 117 may be an SRAM internal to (or integrated into) controller 123 of the storage device 102, while volatile memory 118 may be a DRAM external to (or remote from) controller 123 of the storage device 102. However, in other examples, volatile memory 117 may be a DRAM external to controller 123 and volatile memory 118 may be an SRAM internal to controller 123, volatile memory 117, 118 may both be internal to controller 123 or both be external to controller 123, or alternatively, storage device 102 may include only one of volatile memory 117, 118. Data stored in volatile memory 117, 118 can include data read from the NVM 110 or data to be written to the NVM 110. In this regard, the volatile memory 117, 118 can include a write buffer or a read buffer for temporarily storing data.

The memory (e.g. NVM 110) is configured to store data 119 received from the host device 104. The data 119 may be stored in the cells 116 of any of the NVM memory locations 112. As an example, FIG. 1 illustrates data 119 being stored in different NVM memory locations 112, although the data may be stored in the same NVM memory location. In another example, the NVM memory locations 112 may be different dies, and the data may be stored in one or more of the different dies.

Figure 2:
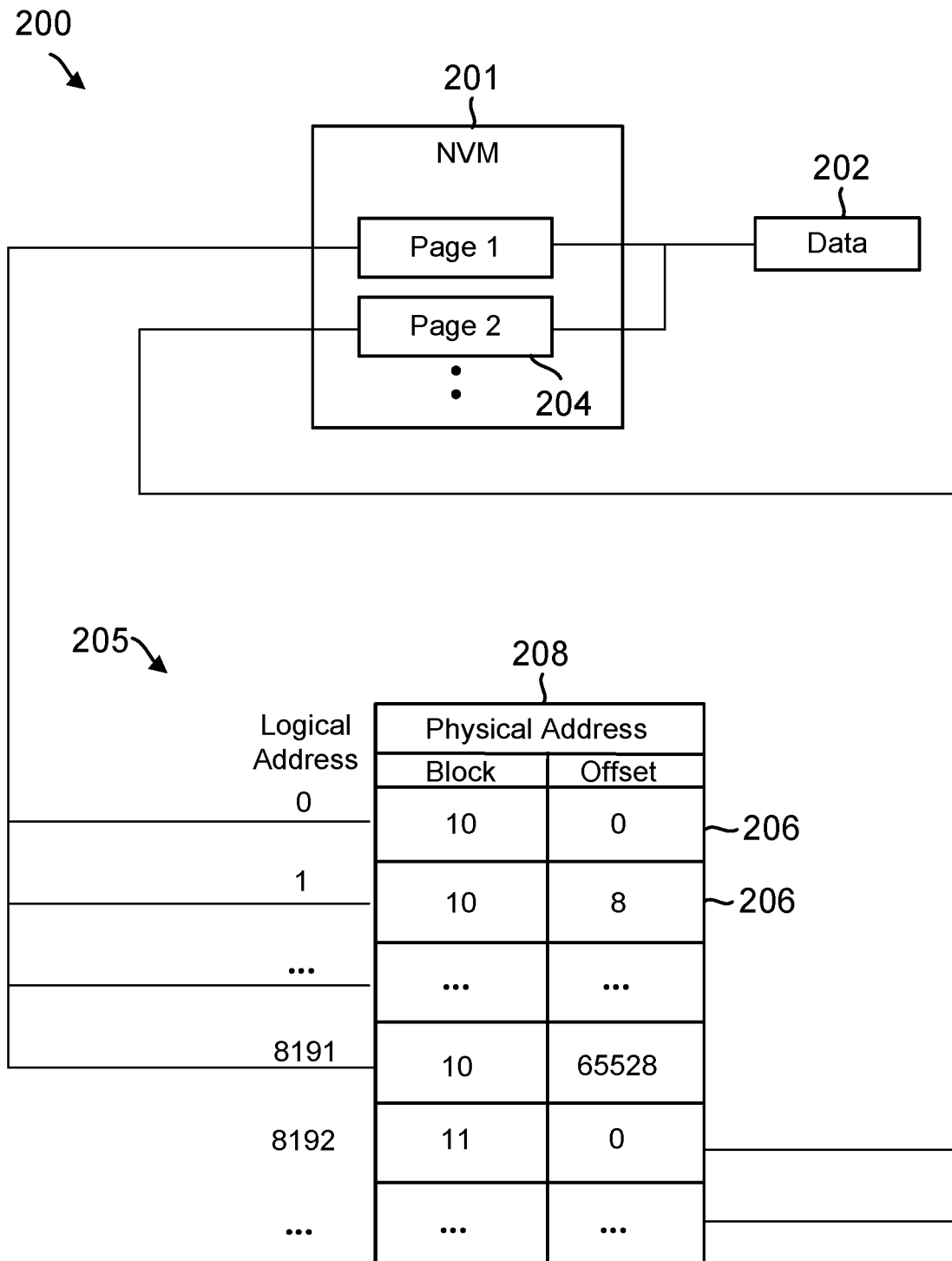
FIG. 2 is a conceptual diagram illustrating an example of a logical-to-physical mapping table in a non-volatile memory of the storage device of FIG. 1.

Each of the data 119 may be associated with a logical address. For example, the volatile memory 118 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a physical address associated with each memory location 112 in the NVM where data is stored. While FIG. 1 illustrates a single L2P mapping table 120 stored in volatile memory 118, in other examples, the L2P mapping table 120 may include multiple tables stored in volatile memory 118. Mappings may be updated in the L2P mapping table 120 respectively in response to host writes, and periodically the L2P mapping table 120 may be flushed from volatile memory 118 to one or more of the NVM memory locations 112 of NVM 110 so that the mappings may persist across power cycles. In the event of a power failure in storage device 102, the L2P mapping table 120 in volatile memory 118 may be recovered during initialization from the L2P entries previously stored in NVM 110. FIG. 2 is a conceptual diagram 200 of an example of an L2P mapping table 205 stored in volatile memory (e.g., the volatile memory 118 of FIG. 1) illustrating the mapping of data 202 received from a host device to logical addresses and physical addresses in NVM 201 (e.g., the NVM 110 of FIG. 1). The data 202 may correspond to the data 119 in FIG. 1, while the L2P mapping table 205 may correspond to the L2P mapping table 120 in FIG. 1. In one example, the data 202 may be stored in one or more pages 204 (e.g., physical pages) in NVM 201. Each page 204 may be associated with a mapping set including one or more entries 206 of the L2P mapping table 205 respectively identifying a physical address 208 mapped to a logical address (e.g., a logical block address (LBA)) associated with the data written to the NVM. A logical page may include one or more of the entries 206. An LBA may be a logical address specified in a write command for the data received from the host device. Physical address 208 may indicate the block and the offset at which the data associated with an LBA is physically written, as well as a length or size of the written data (e.g. 4 KB or some other size). In the illustrated example, page 204 encompassing 32 KB of data 202 may be associated with a mapping set including 8192, 4 KB entries. However, in other examples, page 204 may encompass a different amount of host data (e.g. other than 32 KB of host data) or may include a different number of entries 206 (e.g., other than 8192 entries), or entries 206 may respectively include different host data lengths (e.g., other than 4 KB each).

Referring back to FIG. 1, the NVM 110 includes sense amplifiers 124 and data latches 126 connected to each NVM memory location 112. For example, the NVM memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the NVM memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the NVM memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a system on a chip (SoC), a Field Programmable Gate Array (FPGA), hard-wired logic, analog circuitry and/or a combination thereof.

The controller 123 is configured to receive data transferred from one or more of the cells 116 of the various NVM memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the volatile memory 118 when reading or writing data to the cells 116. For example, the controller 123 may receive logical-to-physical address mappings from the volatile memory 118 in response to read or write commands from the host device 104, identify the physical addresses mapped to the logical addresses identified in the commands (e.g. translate the logical addresses into physical addresses), and access or store data in the cells 116 located at the mapped physical addresses. The controller 123 is also configured to access the L2P mapping table 120 in the NVM 110, for example, following a power failure during initialization, to recover or populate the L2P mapping table 120 in the volatile memory 118.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a NVM memory location 112 in the NVM 110 of storage device 102 for storing the data. The controller 123 stores the L2P mapping in the L2P mapping table 120 to map a logical address associated with the data to the physical address of the NVM memory location 112 allocated for the data. The controller 123 then stores the data in the NVM memory location 112 by sending it to one or more data latches 126 connected to the allocated NVM memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the L2P mapping table 120 to translate the logical addresses specified in the read command to the physical addresses indicating the location of the data. The controller 123 then reads the requested data from the NVM memory location 112 specified by the physical addresses by sensing the data using the sense amplifiers 124 and storing them in data latches 126 until the read data is returned to the host 104 via the host interface 106.

In one aspect of the present disclosure, the host device 104 may include a read-look-ahead (RLA) memory buffer (RMB 128) in host volatile memory 130 (or host memory 103). The RMB 128 is a memory buffer that is dedicated for predicted (RLA) host data. RLA data may include, for example, data that the controller 123 may read from the NVM 110, 201 in advance of receiving a read command for such data. For example, RLA data may include predicted data associated with subsequent logical addresses to logical addresses indicated in prior read commands indicating such subsequent logical addresses. The controller 123 may be configured to predict such subsequent logical addresses based on the prior read commands. For example, if the controller 123 receives read commands for data stored at logical addresses or LBAs 0, 1, 2, 3, and 4, the controller may predict from the sequential logical address pattern that a next or subsequent read command would continue the pattern and thus request data stored at LBA 5. Thus, the controller may be configured to read RLA data at LBA 5 in response to the read commands for requested data at LBAs 0-4.

The controller 123 may be configured to load data 119 and associated L2P mapping updates in the RMB 128. For example, the controller 123 may receive a configuration (e.g., a PCI configuration) from host device 104 indicating parameters for memory writes and reads to RMB 128 via interface 106 (e.g., PCIe interface), and the controller may transfer data 119 and L2P mapping updates via the interface 106 to the RMB 128 after the RMB 128 is allocated based on these parameters. The L2P mapping updates may include entries indicating the mappings of logical addresses associated with the data 119 to physical addresses or offsets in the RMB 128 where the data 119 is stored. The controller 123 may be configured, in response to receiving a vendor-specific command from the host device 104, to allocate the RMB 128 in a portion of the host volatile memory 130. The allocation may be accomplished, for example, via a handshake procedure between the controller 123 and the host device 104 such as described below with respect to FIG. 7A.

RMB 128 is different than the concept of HMB 105. Generally, the controller uses HMB 105 to leverage host system memory to temporarily store Flash Translation Layer (FTL) management tables (e.g., L2P mapping table 120, 205), XOR data (parity data), etc. However, once the HMB 105 is provided or dedicated to the storage device 102, this region is not accessible or visible to the host device or its processor(s) 101 (e.g., a host CPU and/or GPU). In contrast, the RMB 128 is configured to be shared in accessibility between (e.g., exposed to) both the storage device 102 and the host device 104. For example, the controller 123 of storage device 102 may perform data writes to the RMB 128 and the host GPU or CPU may perform data reads from the RMB 128.

Figure 3A:
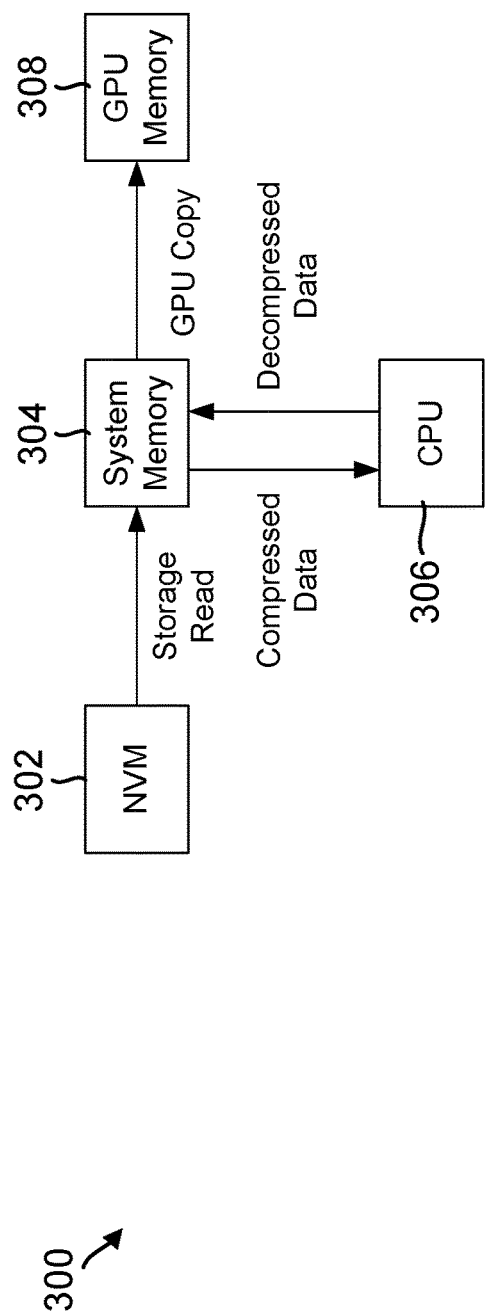
FIGS. 3A-3B are block diagrams illustrating different examples of storage systems incorporating the storage device of FIG. 1.
Figure 3B:
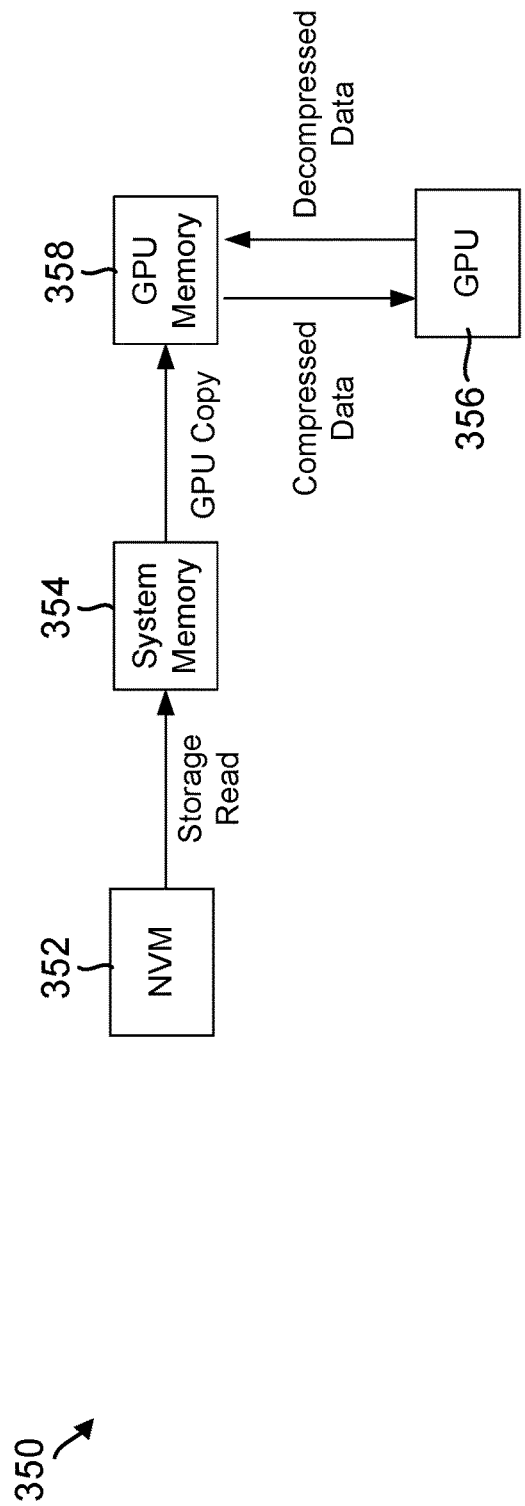

FIGS. 3A-3B illustrate different examples 300, 350 of storage systems incorporating the storage device 102 of FIG. 1, including an NVM 302, 352 (e.g., NVM 110, 201), a system memory 304, 354 (e.g., host volatile memory 130 or host memory 103), a CPU 306 and GPU 356, and a GPU memory 358. In the example 300 of FIG. 3A, GPU assets (e.g., game data) are read from the NVM 302 (e.g., via a read command) into system memory 304 (e.g., host DRAM), and whatever data is read is decompressed at the CPU 306. After decompression, the decompressed data is stored back in the system memory 304, and the GPU copies this data to the GPU memory 308 (e.g., video RAM (VRAM)). The host 104 may issue each request to the storage device 102 using an API that is configured such that a host application (e.g., a game) manages and handles each of these I/O requests individually at a time, and first by submitting the request, waiting for it to complete, and then handling its completion. This can cause total I/O overhead to quickly become too expensive, preventing more modern games from being able to take advantage of increased storage device bandwidths.

In contrast, in the example 350 of FIG. 3B, once data from the NVM 352 is read into the system memory 354, the data is directly copied from the system memory 354 to the GPU memory 358 (e.g., in a GPU copy), and the actual decompression of the data happens at the GPU 356 instead of the CPU 306. Thus, decompressed data stored back in the GPU memory 358 (e.g., VRAM) may be immediately used, saving a lot of time compared to the example 300 of FIG. 3A. For example, the host 104 may apply a different API in the example of FIG. 3B than that of FIG. 3A which may reduce the overhead of individual NVMe I/O requests by segmenting large commands into multiple, smaller I/O commands, batching multiple I/O requests so that read data may be efficiently communicated to and decompressed by the GPU 356, and providing more flexible control to gaming applications regarding when to obtain notifications of completions of I/O requests. Other benefits of the example 350 of FIG. 3B compared to that of FIG. 3A include at least that the GPU 356 supports far higher decompression bandwidths than the CPU 306 (which is helpful for both streaming and load time scenarios), the CPU savings is significant at next-generation I/O rates, the GPU 356 can support constant maxed I/O rates for load time scenarios, and data 119 may be read at a smallest resolution until its destination.

Figure 5:
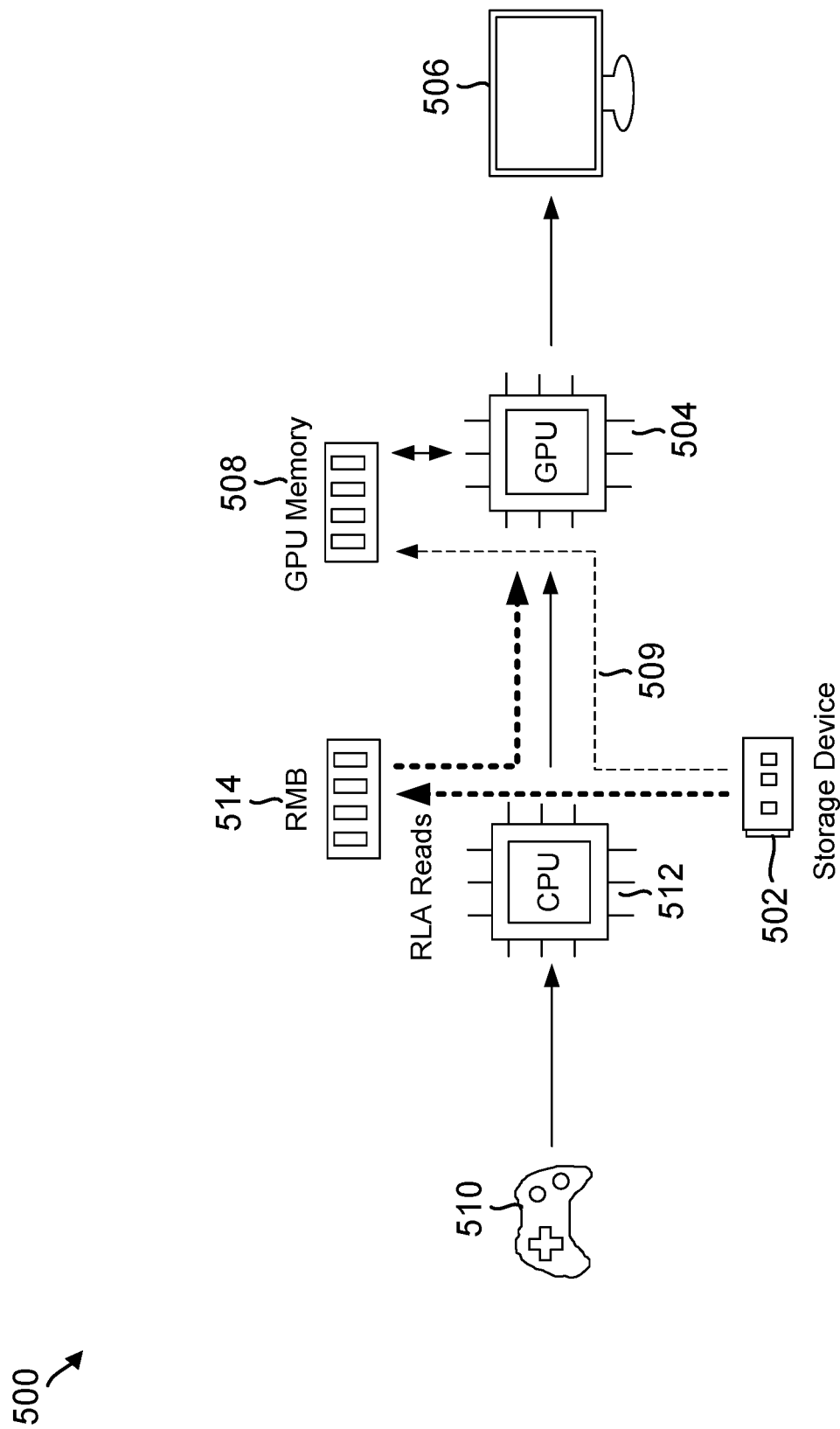
FIG. 5 is a conceptual diagram illustrating an example of a storage system including the storage device of FIG. 1 similar to that of FIG. 3B but further incorporating an RMB.

FIGS. 4A-4C illustrate different examples of sequential data workloads in the storage device 102 of FIG. 1. As illustrated in the different examples, there may be multiple types of workloads that the CPU 306 or GPU 356 expect the controller 123 of the storage device 102 to handle in reading data 119 at sequential logical addresses from the NVM 110, 201, 302, 352. For instance, FIG. 4A illustrates an example 400 of a good sequential workload including sequential logical addresses 402 with uniform gaps between logical addresses in commands. FIG. 4B illustrates an example 420 of a mediocre sequential workload including sequential logical addresses 422 with large gaps between logical addresses in commands. FIG. 4C illustrates an example 440 of a poor sequential workload including logical addresses 442 that appear random in nature (since they jump between larger and smaller logical addresses) but still fall within a logical address range 444 that slowly shifts upwards over time (sequentially) as more commands come in to the storage device 102. In any of these examples, the workloads involve many NVM read commands which the host 104 may send in back-to-back fashion to the controller 123 to read data 119 from the storage device 102. FIG. 5 illustrates an example 500 of a storage system incorporating a storage device 502 (e.g., storage device 102) that operates similar to the storage system in the example 350 of FIG. 3B. For example, the storage device 502 directly loads gaming data into system memory (e.g., system memory 354) from which a GPU 504 (e.g., GPU 356) decompresses the data, and the GPU renders the data to a display 506 (e.g., a computer monitor, etc.). The storage system may have dedicated NVMe queues for GPU-efficient access to the storage device 502. Decompression and decryption may be performed in the GPU hardware or firmware. Textures or other game data may be continuously streamed from the storage device 502 to GPU memory 508 (e.g., GPU memory 358) during gameplay, e.g., via path 509, as rendered scenes change in response to movement of controller 510 or other user input. Such storage systems may improve the game data pipeline to incorporate storage devices 502 with faster storage speeds (e.g., in the GB/s range), as well as include direct PCIe transfers from the storage device 502 to the GPU memory 508 which significantly reduces overhead at CPU 512 and system-level DRAM requirements, improves loading times, and enables new game designs.

However, in contrast to the storage system of FIG. 3B, this storage system of FIG. 5 may further include an RMB 514 (e.g., RMB 128) in which the storage device 502 may store RLA data predicted from sequential data workloads such as illustrated in the examples 400, 420, 440 of FIGS. 4A-4C. In one example, the RMB 514 may be a region of host system memory (e.g., system memory 354) that is dedicated for game content detection and loading from the storage device 102 for optimizing the overhead involved in reading or transferring game content from the storage device 102. The storage device 502 and the host device (e.g., the CPU 512 and GPU 504) may both have access to the RMB 514. For instance, the controller 123 of the storage device 502 may be configured such that, instead of loading RLA data directly to system memory (e.g., system memory 354 or host-side DRAM), the controller 123 may load the data to RMB 514 allocated in the host DRAM (or other system RAM). The GPU 504 may then directly access and use the data stored in the RMB 514 when needed.

In one example of how the GPU may read RLA data, the GPU 504 may initially check the RMB 514 for requested data (e.g., via an API, rather than sending commands to the CPU 512 to check the RMB 514 for data the GPU 504 intends to apply). If the GPU determines that this data is not present in the RMB 514 (e.g., the data has not yet been RLA), the GPU 504 may then request the CPU 512 to send NVMe read commands to the controller 123 to obtain the requested data. Alternatively, the GPU 504 may have a direct communication channel with the storage device 502 (e.g., using GPU-specific or dedicated submission queues and completion queues), and so the GPU 504 may send the read commands to the storage device 502 directly rather than via the CPU 512. In response to an NVMe read command, the controller 123 in storage device 502 may load the requested data in the RMB 514, and post a completion update (e.g., an entry to a completion queue) indicating a pointer to the memory addresses or offsets in the RMB 514 (e.g., RLA buffers within the RMB) storing the requested data. Once the GPU 504 obtains the completion update with the address pointer, the GPU 504 may directly access the RMB for the data at the address(es) indicated. On the other hand, if the GPU 504 initially determines that the requested data is in the RMB 514, such as in response to determining that associated logical addresses of the data are present in an RMB table (e.g., an L2P mapping table stored in or associated with the RMB), the host may avoid sending read commands to the storage device 502 and instead may perform a GPU copy of the requested data from the RMB 514 to the GPU memory 508.

The GPU 504 can continue to access the RMB 514 in such manner until the RMB 514 becomes full, in which case the host may inform the storage device 502 as to which part(s) or region(s) of the RMB 514 the host requests the controller 123 of the storage device 502 to free or otherwise make available for subsequent RLA data. For example, the storage device 502 may later reload new RLA data, or reload a combination of new RLA data as well as older RLA data, in the freed regions of the RMB 514, after which the aforementioned process may again repeat for the reloaded or newly loaded RLA data. To keep track of the regions or buffers of the RMB 514 that are available for use, the host device 104 (e.g., the GPU 504 and/or CPU 512) and storage device 502 may respectively maintain a bitmap, more details of which are described with respect to FIG. 6.

Figure 6:
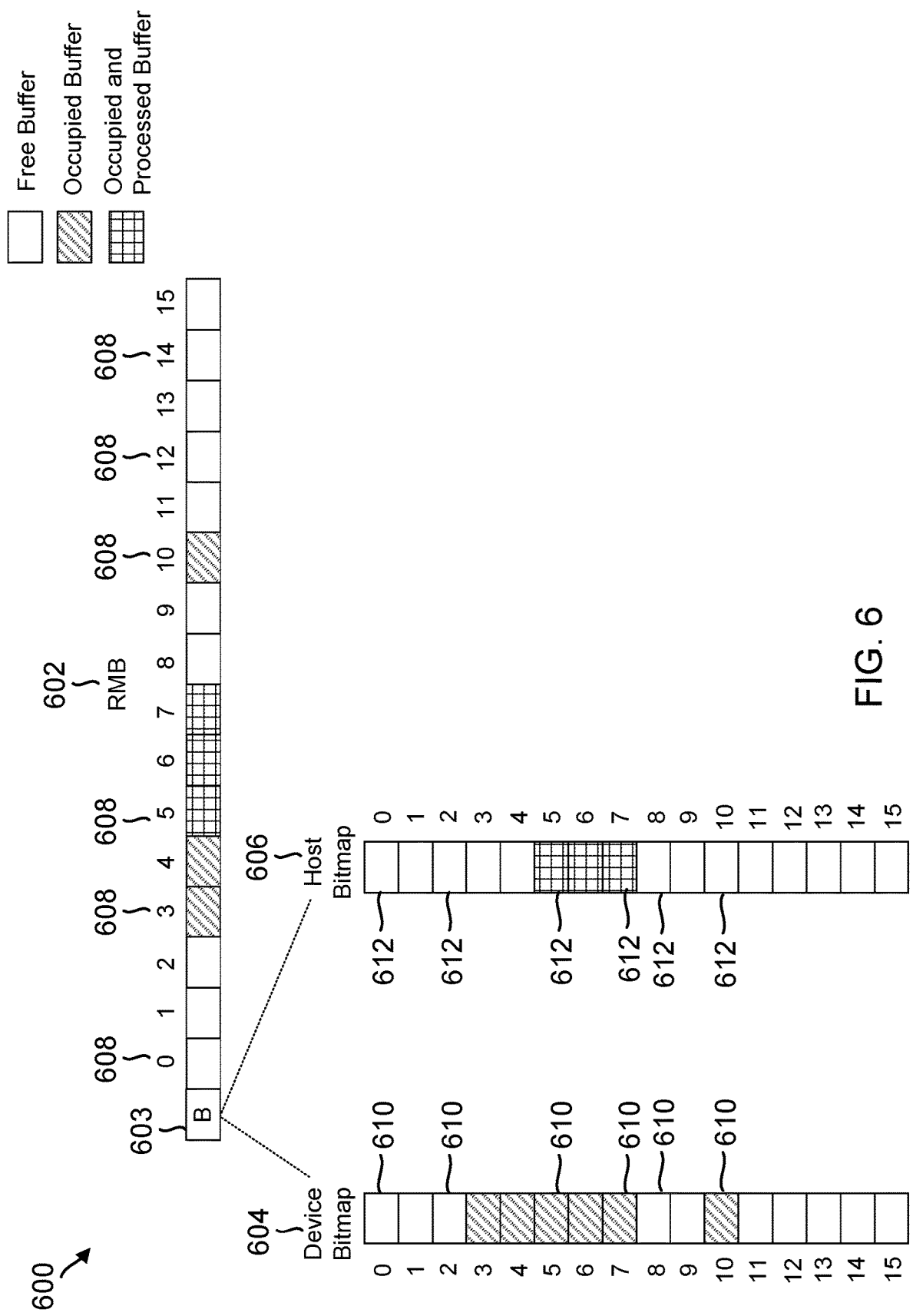
FIG. 6 is a conceptual diagram illustrating an example of an RMB accessible to the host device and the controller of the storage device of FIG. 1.

FIG. 6 illustrates an example 600 of an RMB 602 (e.g., RMB 128, 514) including an RMB maintenance table stored at a common RMB location 603 accessible to the host device 104 and the controller 123 which may be identified for book keeping of RLA buffers between the host and the storage device. The RMB maintenance table may be implemented as bitmaps 604, 606 including two sets of bits stored in a buffer maintained commonly between the host and the storage device in the RMB 602 (e.g., in common RMB location 603). One set of bits or bitmap 604 may be a device-side bitmap which is write-accessible to the controller 123 but read-only to the host 104, depicting usage of RLA buffers 608 currently being used by the storage device 102, 502 for storing RLA data in response to read commands or predictions. The other set of bits or bitmap 606 may be a host-side bitmap that is write-accessible to the host 104 but read-only to the controller 123, indicating the RLA buffers 608 processed by the host device 104. Each bit in the bitmaps 604, 606 may be associated with or correspond to a respective RLA buffer 608 in the RMB 602 (e.g., bit '0' in bitmap 604, 606 is associated with buffer '0', bit '1' in bitmap 604, 606 is associated with buffer '1', etc.).

In one example, initially, bits 610 in the device-side bitmap 604 and bits 612 in the host-side bitmap 606 may be clear (e.g., reset as '0') to indicate the associated RLA buffers 608 are free or unused. Later on, the controller 123 may mark bits 610 (e.g., mark as '1') in the device-side bitmap 604 to indicate these buffers are occupied as it transfers RLA data to the associated buffers 608. For example, before or after the controller 123 predicts RLA data in response to read commands from the host device, the controller may check the device-side bitmap 604 to determine which RLA buffer(s) are free, and the controller 123 may store the RLA data in the associated buffer(s) 608 and mark the associated bits 610 in the bitmap 604 to indicate these buffer(s) are occupied accordingly. The host 104 may copy these bits 610 over to associated bits 612 in its own host-side bitmap 606 as it processes the associated buffers 608. For example, if the host 104 determines that RLA data next to be used for an intended gaming scene is in a respective buffer of the RMB 602, then before using the buffer for processing, the host 104 may mark the associated bit 612 in its host-side bitmap 606 as '1' to indicate the RLA buffer 608 includes processed RLA data, and the host 104 may process the RLA data (e.g., fetch the data from the buffer to render it in the scene). The host 104 may re-read the buffers 608 associated with marked bits (e.g., indicated as processed) if the host requires the data again subsequently to re-render in a scene. Initially, the bitmaps 604, 606 may not match such as illustrated in FIG. 6, since the controller marks bits 610 in the device-side bitmap 604 when RLA data is read into associated buffers (e.g., in advance of read commands from the host for that data), while the host marks bits 612 in the host-side bitmap when RLA data is processed in the associated buffers (e.g., when read commands would otherwise be sent for that data). Eventually, however, the host-side bitmap 606 may match the device-side bitmap 604 once the buffers are fully processed.

When the host 104 no longer requires the RLA data currently stored in one or more of these buffers 608, the host 104 may update (e.g., clear or reset as '0') the bits 612 corresponding to these buffer(s) 608 in its host-side bitmap 612. For example, if the host completes processing of its read commands for a scene, if the host intends to render a completely different scene with different game data, and/or if the host determines to simply ignore the RLA data in any of these buffers without processing them, the host 104 may clear one or more bits of its host-side bitmap 612. The host 104 may also send a release command to the storage device 102, 502 indicating the buffer(s) 608 which the host requests the storage device to free or clear. For example, the release command may include the host-side bitmap 612, and the controller 123 may determine which buffers to release (e.g., free or empty) in the RMB 602 based on which bits 612 the host 104 has marked as '0' in the host-side bitmap 612. In addition to freeing the RLA buffers 608 indicated in the release command, the controller 123 may clear the bits 610 in the device-side bitmap 604 corresponding to the reset bits in the host-side bitmap 612 (e.g., by setting the bits likewise to '0') such that the device-side bitmap 604 matches the host-side bitmap 606. Afterwards, the controller 123 may store new RLA data (or same RLA data even) in the free buffers as needed and update its device-side bitmap 604 as previously described, and the host 104 may similarly process the new RLA data (or same RLA data even) in the occupied buffers as needed and update its host-side bitmap 606 as also previously described. Alternatively, rather than the host device 104 clearing the host-side bitmap 606 first and the controller 123 clearing the device-side bitmap 604 second to match, the process can be reversed where the controller 123 clears the device-side bitmap 604 first and the host 104 clears the host-side bitmap 606 second to match. For example, before marking the bits 612 in its bitmap 606 as '0', the host 104 may provide a release command to the storage device 102, 502 indicating which RLA buffers 608 the controller 123 is to free. In response to the release command, the controller may mark the bits 610 in its bitmap 604 as '0' in addition to freeing the buffers 608, and then send a completion response (e.g., post a completion queue element indicating completion of the release command) or acknowledgement in response to the release command. In response to completion or acknowledgement of the release command, the host can then clear or reset the bits 612 in its bitmap 606 to match that of bitmap 604. Afterwards, the controller 123 and host may utilize the RMB 602 and respectively update their bitmaps 604, 606 again as previously described.

In the aforementioned example, the controller 123 may use PCI-level memory writes and memory reads to easily access bits 610, 612 respectively in the bitmaps 604, 606 in the common RMB location 603 pointed to by a PCI configuration from the host 104, although NVMe-level writes or reads can be implemented in other examples (e.g., the bitmaps 604, 606 may be stored in the NVM 110, 201 instead of in the RMB 602). In other examples, the bitmaps 604, 606 may both be stored in host volatile memory 130 or host memory 103 in a location other than the RMB 128, 514, 602, the bitmaps 604, 606 may both be stored in volatile memory 117 of the controller (e.g., in controller memory buffer) or in volatile memory 118 of the storage device 102, or the bitmaps 604, 606 may be stored in separate devices respectively (e.g., the bitmap 604 may be stored in the storage device 102, 502 while the bitmap 606 may be stored in the host device 104). Additionally, in the aforementioned example, two bitmaps 604, 606 are maintained to avoid RMB synchronization issues between the host 104 and storage device 102, since utilizing a single bitmap may otherwise result in possible errors for example in cases where the storage device 102, 502 frees one RLA buffer (e.g., in association with marking the corresponding bit in a bitmap as '0') at a time that the host intends to process that buffer 608 (e.g., in association with marking the same bit in the bitmap as '1').

Figure 7A:
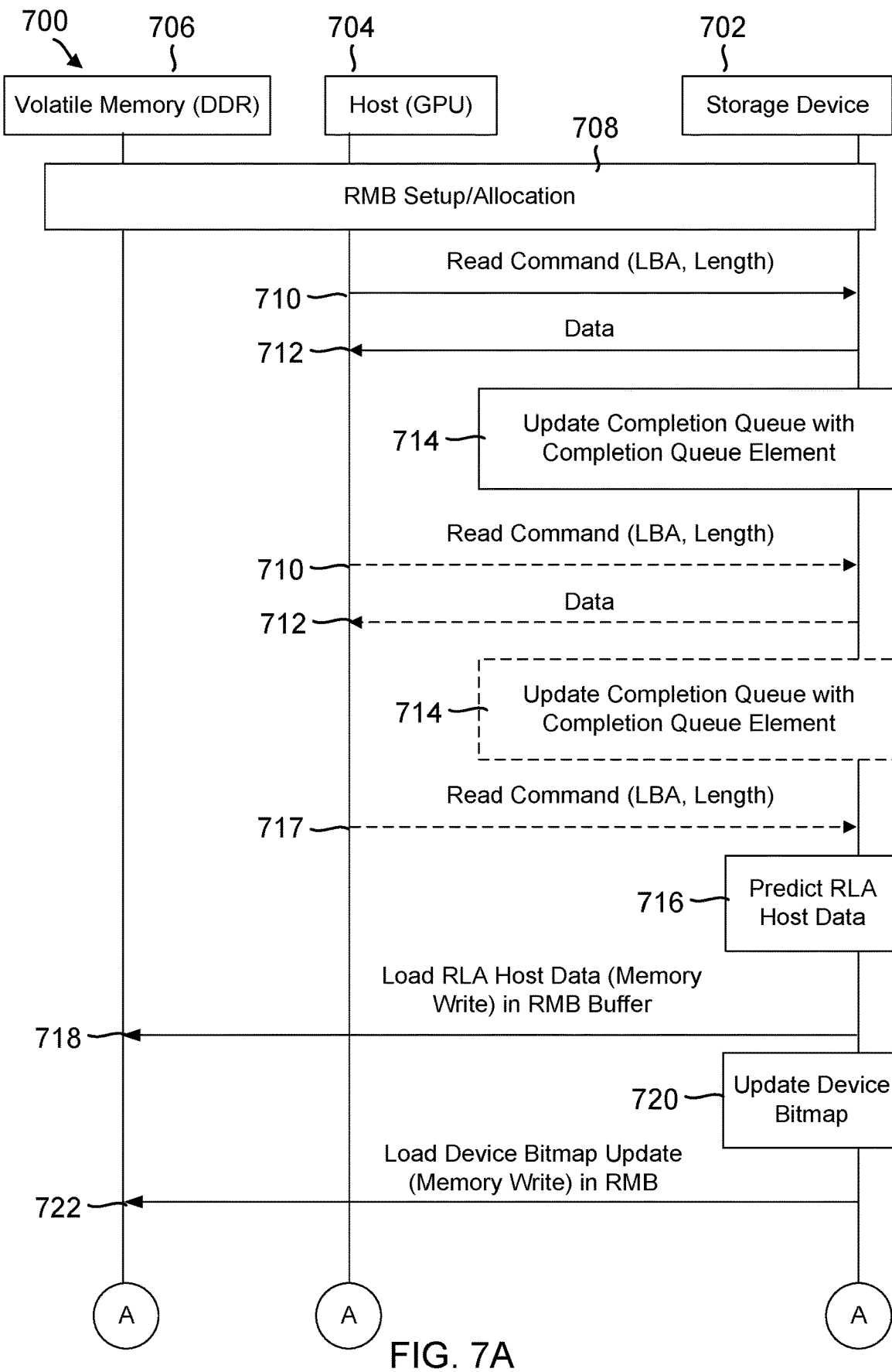
FIGS. 7A-7B are conceptual diagrams illustrating examples of RMB-based or enabled communication flows between the storage device of FIG. 1 and a host coupled to a volatile memory including an RMB.
Figure 7B:
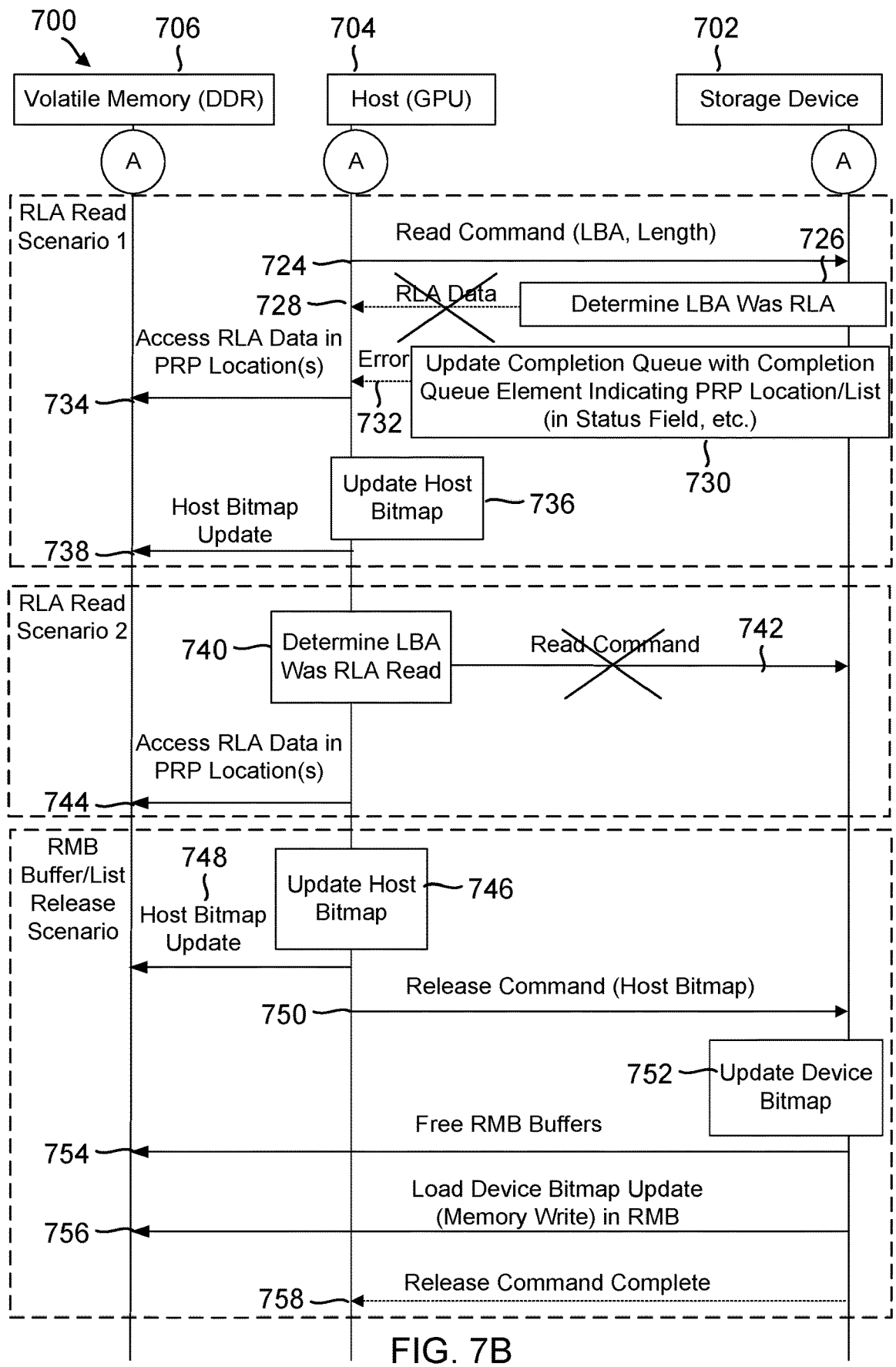

FIGS. 7A-7B illustrate an example 700 of an RMB-based or enabled communication flow between a storage device 702 (e.g., a controller in storage device 102, 502) and a host 704 (e.g., a GPU in host device 104), where the host 704 includes or is coupled to a volatile memory 706 (e.g., host volatile memory 130 or host memory 103) including an RMB (e.g., RMB 128, 514, 602). Initially, at block 708, the RMB (e.g., its buffer locations or RLA buffers 608) may be configured or allocated as a result of a handshake procedure between the host 704 and the storage device 702, such as in response to start-up of a gaming application at the host 704. For example, after application start-up and in response to receiving an identify controller command (or other capability information request) from host 704, the controller in storage device 702 may send an identify controller data structure (or other capability information message) to host 704 that indicates (e.g., using one or more vendor-specific reserved bits) controller support for RMB use. In response to this message, the host 704 may send the controller one or more messages indicating enablement of the RMB 128, 514, 602 and the location(s) or memory address(es) of the RMB and its RLA buffers 608 in volatile memory 706 (e.g., using one or more set feature commands). After the controller of storage device 702 acknowledges the command(s), the RMB 128, 514, 602 may be successfully setup and ready for storing RLA data for use in that application.

After the RMB 128, 514, 602 is set up or allocated in the volatile memory 706, the controller in storage device 702 may predict data to RLA into the RMB based on prior read commands from the host 704, such as read commands 710 in FIG. 7A. Alternatively, the host itself may perform the prediction of the RLA data it will use and therefore send read commands 710 to the storage device indicating the logical addresses for this predicted RLA data. In either case, if the host 704 later requests read data that was previously predicted and RLA in the RMB such as during the timeframe designated as RLA Read Scenario 1 in FIG. 7B, the host may provide read commands without indicating any physical region page (PRP) address entries or lists. Instead, the controller may indicate in a completion command or queue entry in response to the read command the PRP entries or list determined during the RMB handshake procedure, which PRPs indicate the address(es) in the RMB where the requested data is stored. When the host later intends to use this data again such as during the timeframe designated as RLA Read Scenario 2 in FIG. 7B, for example, when subsequently loading a same scene in the game, the host may refrain from sending a read command to the storage device and instead directly read the previously RLA data from the RMB.

Thus, the RMB 128, 514, 602 allows for NVMe data transfers to be avoided in scenarios where the host 704 provides the storage device 702 a read command for an LBA that was previously RLA and stored in the RMB, and scenarios where the host 704 reads from the RMB an LBA that was previously RLA into the RMB without providing any read command to the storage device 702. In the former scenario, the controller may create a PRP list in the completion queue entry for the read command which indicates the PRPs in the RMB where the host may access the requested RLA data, while in the latter scenario, no read commands are sent to the storage device so the storage device does not create any PRP lists in response. The host may thus read RLA data which the storage device writes to its RMB in its volatile memory 706 without sending NVM I/O commands to the storage device, and similarly the host may perform multiple reads of the same data residing in the RMB without sending NVM I/O commands to the storage device.

After the RMB 128, 514, 602 is allocated or its buffers setup in response to set feature commands or other RMB allocation-related commands at block 708 of FIG. 7A, the controller of storage device 702 and host 704 may respectively update the device-side bitmap 604 and host-side bitmap 606 as data is loaded into various buffers 608 of the RMB in response to various RLA predictions or read commands. Via these bitmaps, the host may indicate to the storage device which buffers 608 or memory addresses of the RMB are currently free or occupied so that the controller 123 may determine which RMB addresses or regions are available for transfers of next RLA data. When the buffers 608 are fully occupied or if the host later requests the buffers be freed for different (or same) RLA data, the host may provide a release command such as during the timeframe designated as RMB Buffer/List Release Scenario in FIG. 7B to release part of or all of the buffers in the RMB so that the storage device may free up the space and transfer different (or same) RLA data subsequently to the freed memory addresses or regions. The RMB allocation related commands (e.g., set feature commands), read commands, and release commands may be configured as vendor-specific commands according to NVMe vendor specific mechanics known to one of ordinary skill in the art. After the RMB is allocated, the host can send read commands and RMB release commands, and if enabled, the controller may process these commands accordingly.

Referring to FIG. 7A, during operation, initially the host 704 may send read commands 710 to the storage device 702 to read data 712 at indicated logical addresses. For instance, the host 704 may submit read commands to a submission queue stored in volatile memory 706 and update a doorbell register, and the controller 123 of storage device 702 may fetch the submission queue entries including the read commands from the submission queue in response to the doorbell register update. The host may send read commands 710 that include at least one or more logical addresses or LBAs, and a length or size of the command. Moreover, in response to a request from the controller 123 subsequent to sending a respective one of read commands 710, the host may provide PRP entries or PRP lists indicating the addresses of physical pages in volatile memory 706 where the read data 712 is to be loaded to complete the respective read command. In response to read command 710, the controller may read the data 712 at the indicated logical addresses up to the length of the command, and provide the data 712 to the host 704 (e.g., the GPU) to be stored in volatile memory 706 (outside of the RMB). The controller may also, at block 714, update an entry or element of a completion queue indicating completion of the respective read command. This process of sending read command 710, reading data 712 in response to the read command 710, and updating the completion queue at block 714 indicating completion of the read command 710, may occur multiple times (e.g., twice in the illustrated example of FIG. 7A) for different read commands respectively indicating different LBAs for different data and command completions.

After reading data requested at indicated logical addresses in one or more respective read commands 710, the controller of storage device 702 may perform RLA in response to the read command(s) 710. For instance, at block 716, the controller may predict subsequent logical addresses that the host may possibly request to be read, such as sequential logical addresses to the indicated logical addresses in the previous read command(s), and the controller may read the data at the predicted logical address (the predicted data) in advance of possibly receiving a read command for this data (RLA). Alternatively, instead of the controller predicting logical addresses for RLA in the storage device 702 at block 716 based on logical addresses in prior received read commands, the host 704 may perform the RLA prediction itself based on logical addresses in its previously sent read commands 710 (before the host actually intends to use this RLA data), and the host may send a read command 717 indicating the predicted logical addresses of the RLA data for the controller to read in response.

In either example, after reading the RLA data in response to the controller or host prediction, the controller of storage device 702 may load this predicted, RLA data in a free buffer of the RMB 128, 514, 602. For example, the controller may check the device-side bitmap 604 to select a free buffer from RLA buffers 608 in the RMB 602, and the controller may memory write the RLA data in the selected buffer during load operation 718. The controller may also store in volatile memory 117 or 118 an L2P mapping update associated with the RLA data in the L2P mapping table, which update or entry may indicate a mapping of the logical address associated with the RLA data to the physical address of the RLA buffer where the RLA data is stored. The controller may further update the device-side bitmap 604 to mark the bit (e.g., as '1') associated with the selected buffer as occupied at block 720, and the controller may load the updated device-side bitmap in the allocated location for the bitmap in the RMB during load operation 722 (or store the bitmap 604 elsewhere in the host volatile memory or storage device in other examples).

Referring to FIG. 7B, in a first read scenario, after one or more buffers 608 of the RMB 128, 514, 602 are loaded with RLA data in the volatile memory 706, the host 704 may refrain from creating PRP packets for read commands indicating logical addresses associated with previous RLA data. For instance, the host 704 may not include PRP entries, PRP lists, or otherwise indicate addresses where read data is to be loaded in connection with a read command 724 indicating a logical address associated with previous RLA data. For example, initially the host 704 may be unaware that data associated with a required logical address for a current scene was previously loaded into the RMB (e.g., at load operation 718), and so the host may send read command 724 to the storage device 702 requesting that the controller read the data from the NVM 110, 201, 302, 352 in response to the command. However, here the controller 123 of storage device 102, 502, 702 may determine at block 726 that the indicated logical address or LBA in the read command 724 was previously RLA, and so the controller may refrain from transferring RLA data 728 to the host in response to the read command 724. For example, if the controller 123 determines at block 726 that the logical address in read command 724 is mapped to the RMB in L2P mapping table 120, 205, then instead of reading the data again from the NVM 110, 201, 302, 352 and re-loading the data to the RMB, the controller may inform the host 104 of the PRPs (e.g., in one or more of the RLA buffers 608) in the RMB 602 where the previously RLA data is currently stored. For instance, at block 730, the controller may generate PRP entries or a PRP list indicating PRPs (the physical page addresses) in the RMB of volatile memory 706 where the RLA data was previously loaded at load operation 718, and when the controller updates the entry or element of the completion queue indicating completion of the respective read command, the controller may indicate these PRP entries or list in the completion queue element. For example, the controller may include a pointer to the PRP list or PRPs in a status field or other field of the completion queue element that the controller posts indicating completion of the read command. The controller may also return an error message 732 to the host 704 indicating that the submitted read command was for previous RLA data.

In response to the error message 732 or completion queue element updated at block 730, the host 704 may directly access the loaded data it requested from the RMB 128, 514, 602 during a fetch operation 734 of the PRPs which were indicated in the command completion. The host 704 may also store in its volatile memory 706 an L2P mapping update in an L2P mapping table indicating a mapping of the logical address associated with the RLA data 728 to the physical address of the RLA buffer 608 where the RLA data 728 is stored. Since the host had sent read command 724 to the storage device 702 with the intent of obtaining the data for processing at this time (e.g., rendering a current scene), the host 704 may further update at block 736 its host-side bitmap 606 to mark the bit(s) (e.g., as '1') respectively associated with the RLA buffer(s) 608 corresponding to the indicated PRPs where the RLA data was loaded. The host may then load the updated, host-side bitmap 606 in the allocated location for the bitmap in the RMB during load operation 738 (or store the bitmap 606 elsewhere in the host volatile memory or storage device in other examples). After obtaining the RLA data from the RMB, the host may decompress the data and apply it (e.g., render the data in a game scene). Thus, overhead may be reduced in read command creation as a result of RMB use.

Still referring to FIG. 7B, in a second read scenario, the host 704 may refrain from sending read commands to the storage device indicating logical addresses associated with RLA data that was previously requested in a prior read command. For instance, the host 704 may intend to again apply RLA data 728 associated with a logical address that was previously requested in read command 724 (e.g., to render the data again in a game scene that repeated or for some other reason). However, in contrast to the first example where the host was unaware the RLA data 728 was already stored in the RMB 128, 514, 602, here the host may determine at block 740 that the indicated logical address or LBA was previously RLA and is stored in the RMB. For example, the host 704 may determine at block 740 that the logical address of the data it intends to apply is currently mapped to the RMB in an L2P mapping table. As a result, instead of sending read command 724 again for the data as in the first read scenario, here the host 704 may refrain from sending a read command 742 to the storage device 702 for the RLA data 728, and the host 704 may instead directly access the loaded data again from the RMB 128, 514, 602 during another fetch operation 744 of the PRPs or memory addresses associated with the logical address in the RMB. Thus, not only may overhead be reduced in read command creation as a result of RMB use as in the first read scenario example, but overhead may further be reduced in read command completion as well in the second read scenario example. For example, here since the host 704 does not send read command 742 to the storage device 702 but instead directly accesses the RMB for the RLA data 728, the controller 123 may not only refrain from transferring RLA data 728 as in the prior example but also refrain from posting a completion queue element indicate the PRPs where the RLA data was previously loaded (since no read command was sent and thus no completion element will be posted in response).

After the RLA buffers 608 are occupied (e.g., in response to completion of read commands), the host 704 and storage device 702 may undergo an RMB buffer release process. For example, after determining to process RLA buffers 608 to load one or more scenes, updating at block 746 the host-side bitmap 606 where applicable to mark bits (e.g., as '1') associated with processed buffers, and loading during load operation 748 the updated host-side bitmap in the RMB or elsewhere, the host 704 may determine that the RLA data stored in the occupied buffers is no longer necessary or useful. For example, the host 704 may have changed to rendering a different scene in the gaming application. As a result of this change, the host 704 may provide a release command 750 (an RLA_RMB_List_Release vendor-specific command or a similar command by some other name) to the storage device 702 indicating the RLA buffer(s) 608 requested to be released. For example, the host 704 may include the host-side bitmap 606 in the release command, where the marked buffer(s) (e.g., as '1') are those indicated to be freed. Alternatively or additionally, the host may send a set of release commands that indicate a list of buffers intended to be freed.

In response to the release command(s) 750 indicating to release the RMB 128, 514, 602 (all the RLA buffers) or alternatively one or more specific RLA buffers, at block 752 the controller 123 of storage device 102, 502, 702 may update the device-side bitmap 604 to reset (e.g., mark as '0') the bits corresponding to the buffer(s) 608 that are (or are to be) freed. The controller 123 may free (e.g., empty) the RLA buffers indicated in the release command(s) 750 during operation 754, and the controller may load the updated device-side bitmap 604 indicating the freed buffers in the allocated location for the bitmap in the RMB during load operation 756 (or store the bitmap 604 elsewhere in the host volatile memory or storage device in other examples). The controller may further indicate to the host in operation 758 that the release command 750 has been completed, in response to which indication the host may update its host-side bitmap 606 to reset (e.g., mark as '0') the bits corresponding to the freed buffers. Afterwards, the storage device and host may respectively load and access RLA data in these freed buffers as previously described, updating the device-side bitmap and host-side bitmap respectively whenever a freed buffer is again occupied with RLA data or processed.

Accordingly, aspects of the present disclosure provide optimizations to recent evolutions in APIs to load game content. In one aspect, the host can save itself time in generating multiple I/O commands since the host has already indicated to the storage device which data it may read next via its previous commands (or the storage device otherwise has already predicted the RLA data the host will later request) and the storage device has previously placed that particular data in advance into the RMB. Thus, the host GPU may save significant time in preparation of its commands or its overhead involved with respect to transferring data when that data is required (since the RLA data has already been transferred ahead of time). Scene loading times would also significantly improve since the predicted next scene(s) have been pre-loaded to the RMB. The host processing time to create a PRP list/packets may further be reduced for commands associated with RLA data, thereby significantly reducing command preparation time. The storage device or host may predict next scene(s) to read in advance and respectively preload or access the data for these scenes in the RMB. In case the data that the host requests does not match RLA data currently stored in the RMB (e.g., due to a new different scene being loaded), the host may request the storage device to discard the content in the RMB via a release command. Thus, even poor sequential workloads such as illustrated in FIG. 4C (where read content may be relatively random at larger or smaller logical addresses within a given range) may be improved or effectively handled at the host when associated RLA data is maintained in the RMB, since the host may continue to read or re-read this data from the RMB rather than from the storage device whenever the data is needed. While the aspects and concepts described throughout this disclosure relate to gaming applications or game data as an example, it should be understood that the data stored and accessed in the RMB is not limited to game data but may include data in other applications, such as video editing applications, database applications, other high performance applications, and the like.

Figure 8A:
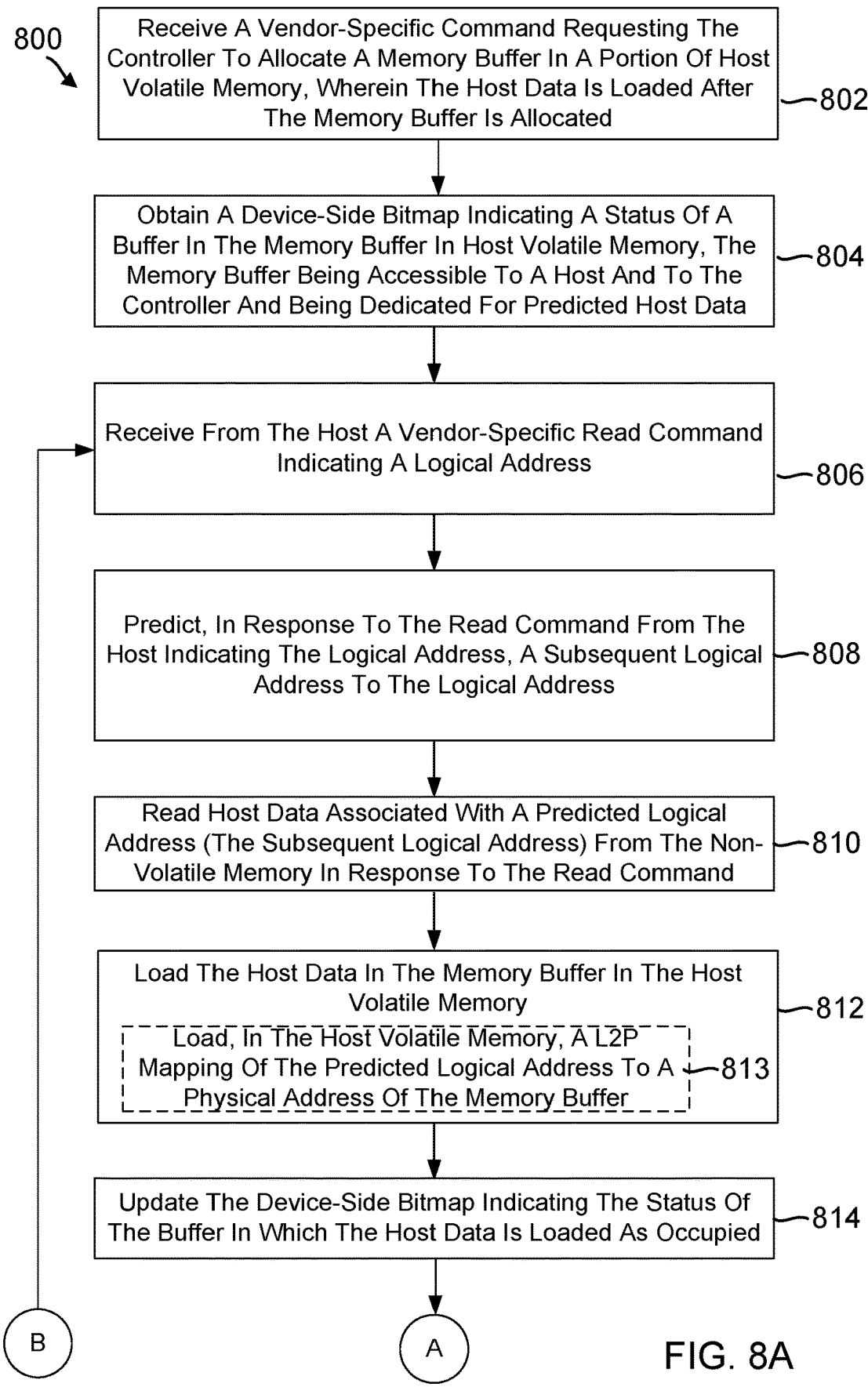
FIGS. 8A-8B are a flow chart illustrating an example of a method of optimizing a storage device for gaming loading and rendering using an RMB, as performed by the storage device of FIG. 1.
Figure 8B:
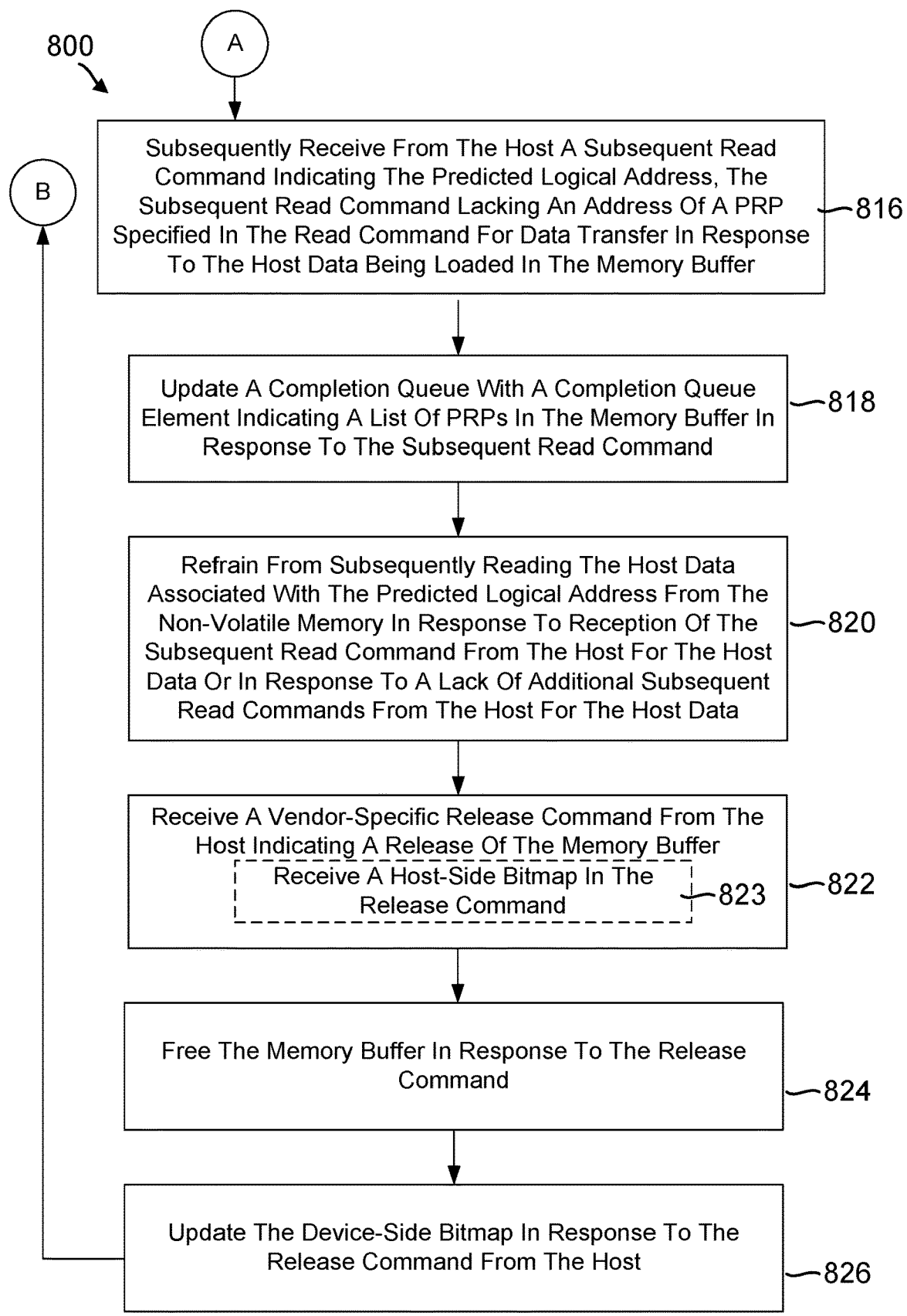

FIGS. 8A-8B illustrates an example flow chart 800 of a method of optimizing a storage device for gaming loading and rendering using an RMB. For example, the method can be carried out in a storage device 102 such as the one illustrated in FIG. 1. Each of the steps in the flow chart can be controlled using the controller as described below (e.g. controller 123), by a component or module of the controller, or by some other suitable means.

Referring to FIG. 8A, at block 802, the controller may receive a vendor-specific command (e.g., a set feature command or other vendor-specific command during block 708 of FIG. 7A) requesting the controller to allocate a memory buffer (e.g., RMB 128, 514, 602) in a portion of host volatile memory (e.g., host volatile memory 130, volatile memory 706), the memory buffer being accessible to a host (e.g., host device 104) and to the controller (e.g., in contrast to HMB 105) and being dedicated for predicted host data (e.g., data 119, RLA data 728).

At block 804, the controller may obtain (e.g., from common RMB location 603 or elsewhere) a device-side bitmap (e.g., bitmap 604) indicating a status (e.g., free or occupied) of a buffer (e.g., RLA buffer 608) in the memory buffer in host volatile memory (e.g., the RMB).

At block 806, the controller may receive from the host a vendor-specific read command (e.g., read command 710 or 717) indicating a logical address (e.g., logical address 402, 422, 442 in L2P mapping table 120, 205, such as an LBA).

At block 808, the controller may predict (e.g., at block 716), in response to the read command from the host indicating the logical address, a subsequent logical address to the logical address (e.g., logical address '5' may be predicted as a subsequent or next LBA to be requested based on a prior sequential pattern of logical addresses '0-4' indicated in read commands 710).

At block 810, the controller may read host data (e.g., data 119, 712) associated with a predicted logical address (e.g., the subsequent logical address at block 808) from non-volatile memory (e.g., NVM 110, 201, 302, 352) in response to the read command (e.g., received at block 806).

At block 812, the controller may load the host data in the memory buffer in the host volatile memory (e.g., during load operation 718). Similarly, at block 813, the controller may load, in the host volatile memory, a L2P mapping of the predicted logical address to a physical address of the memory buffer.

At block 814, the controller may update the device-side bitmap (e.g., at block 720) indicating the status of the buffer in which the host data is loaded as occupied (e.g., bit '3' in bitmap 604 may be marked with a '1' to indicate its corresponding buffer is occupied if the data is loaded into RLA buffer '3' in RMB 602 in the illustrated example of FIG. 6).

Referring to FIG. 8B, at block 816, the controller may subsequently receive from the host a subsequent read command indicating the predicted logical address (e.g., read command 724). The subsequent read command may lack an address of a PRP specified in the subsequent read command for data transfer in response to the host data being loaded in the memory buffer (e.g., RMB 128, 514, 602). In one example, if read commands generally include PRP entries or PRP lists in the read command itself (e.g., if PRPs are specified in the command for data transfer as opposed to, for example, scatter-gather-lists (SGLs)), then a read command for prior RLA data may leave such entries blank or otherwise exclude PRP entries or PRP lists in the read command. In another example, if the host generally sends PRP lists separately from read commands in response to requests for such PRPs from the storage device, then in response to determining at block 726 that the logical address indicated in read command 724 is associated with prior RLA data, the controller may refrain from sending a request to the host to provide the controller a PRP list indicating the PRPs where the RLA data 728 is to be stored. Thus the host may not send a PRP list to the controller in connection with read command 724. Instead, in either example at block 818, in response to the subsequent read command (e.g., read command 724), the controller may update a completion queue (e.g., stored in host volatile memory 130, volatile memory 706) with a completion queue element indicating a list of PRPs in the memory buffer (e.g., the RMB) where the requested data is stored (e.g., where the RLA data 728 was stored during load operation 718).

At block 820, the controller may refrain from subsequently reading the host data associated with the predicted logical address from the non-volatile memory in response to reception of the subsequent read command from the host for the host data (e.g., in RLA read scenario 1 of FIG. 7B, in response to receiving read command 724, the controller may not read RLA data 728 from the NVM 110, 201, 302, 352 associated with the LBA indicated in read command 724). Alternatively, the controller may refrain from subsequently reading the host data associated with the predicted logical address from the non-volatile memory in response to a lack of additional subsequent read commands from the host for the host data (e.g., in RLA read scenario 2 of FIG. 7B, the controller may not receive additional read commands subsequent to read command 724 for the same RLA data, and so the controller may similarly not read the RLA data 728 from the NVM 110, 201).

At block 822, the controller may receive a vendor-specific release command (e.g., release command 750) from the host indicating a release of the memory buffer (e.g., one or more RLA buffers 608 in RMB 128, 514, 602). Similarly, at block 823, the controller may receive a host-side bitmap in the release command (e.g., bitmap 606). At block 824, the controller may free the memory buffer (e.g., the RMB) in response to the release command (e.g., during operation 754 in FIG. 7B).

At block 826, the controller may update the device-side bitmap (e.g., bitmap 604) in response to the release command from the host (e.g., at block 752 in FIG. 7B).

Figure 9:
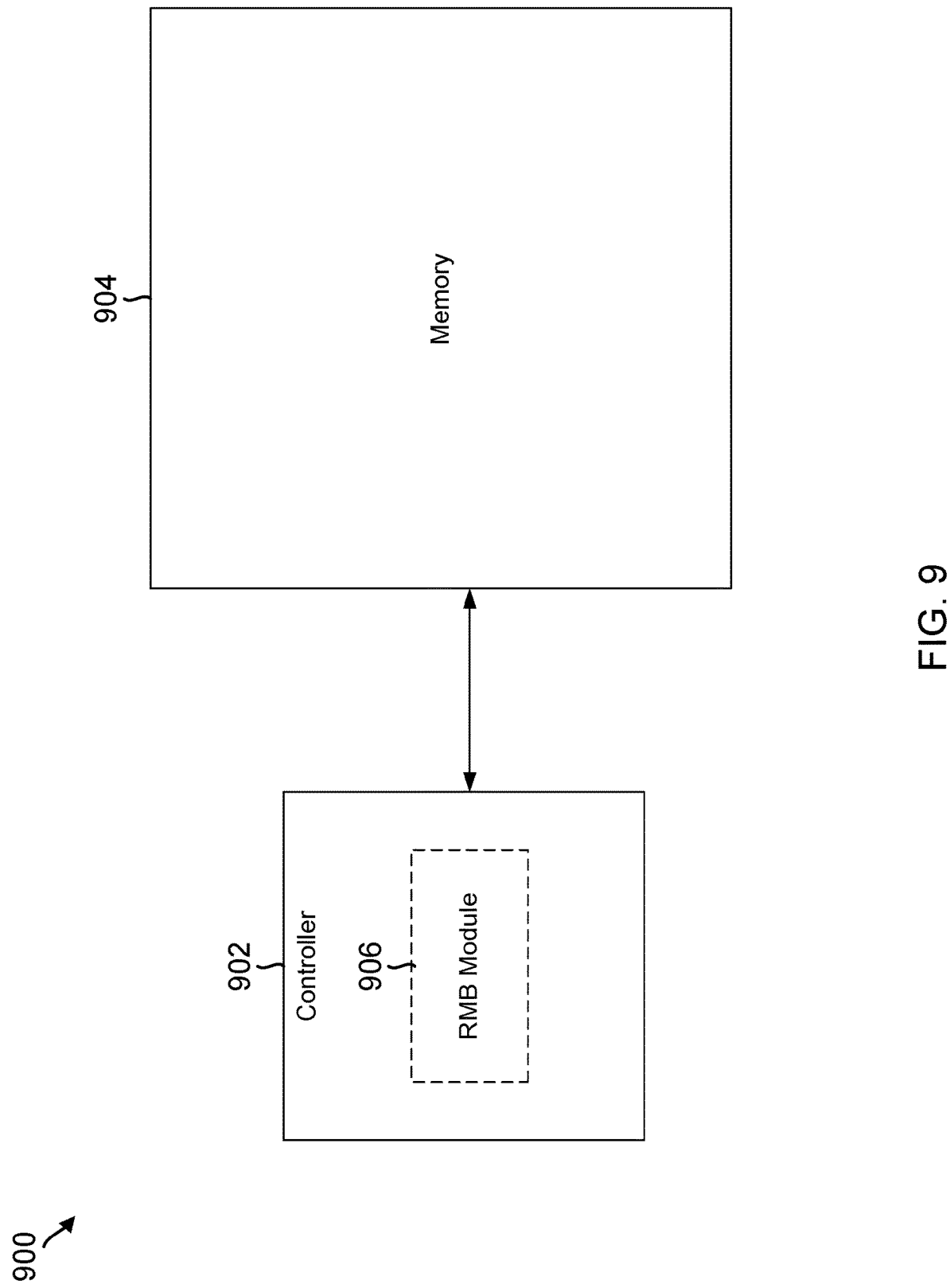
FIG. 9 is a conceptual diagram illustrating an example of a controller that optimizes the storage device of FIG. 1 for gaming loading and rendering using an RMB.

FIG. 9 is a conceptual diagram illustrating an example 900 of a controller 902 coupled to a memory 904 in a storage device. For example, controller 902 may correspond to controller 123, and memory 904 may correspond to the NVM 110, 201 of the storage device 102 in FIG. 1. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

In one example, the controller 902 includes an RMB component 906 that may provide a means for optimizing a storage device for gaming loading and rendering using an RMB. For example, the RMB component 906 may perform the process described above with respect to FIGS. 8A-8B.

Clause 1. A storage device, comprising: non-volatile memory; and a controller configured to: receive from a host a read command indicating a logical address; read host data associated with a predicted logical address that is subsequent to the logical address from the non-volatile memory in response to the read command; load the host data in a memory buffer in host volatile memory that is accessible to the host and to the controller, the memory buffer being dedicated for predicted host data; and subsequently receive from the host a subsequent read command indicating the predicted logical address, the subsequent read command lacking an address of a physical region page (PRP) specified in the read command for data transfer in response to the host data being loaded in the memory buffer.

Clause 2. The storage device of clause 1, wherein the memory buffer dedicated for the predicted host data is a read-look-ahead memory buffer (RMB) that is different than a host memory buffer (HMB).

Clause 3. The storage device of clause 1 or clause 2, wherein the controller is further configured to: receive a vendor-specific command requesting the controller to allocate the memory buffer in a portion of the host volatile memory, wherein the host data is loaded after the memory buffer is allocated.

Clause 4. The storage device of any of clauses 1 to 3, wherein the controller is further configured to: predict a subsequent logical address to the logical address indicated in the read command, the predicted logical address being the subsequent logical address.

Clause 5. The storage device of any of clauses 1 to 3, wherein the read command from the host indicates the predicted logical address.

Clause 6. The storage device of any of clauses 1 to 5, wherein the controller is further configured to: load, in the host volatile memory, a logical-to-physical (L2P) mapping of the predicted logical address to a physical address of the memory buffer.

Clause 7. The storage device of any of clauses 1 to 6, wherein the controller is further configured to: refrain from subsequently reading the host data associated with the predicted logical address from the non-volatile memory in response to reception of the subsequent read command from the host for the host data or in response to a lack of additional subsequent read commands from the host for the host data.

Clause 8. The storage device of any of clauses 1 to 7, wherein the controller is further configured to: update a completion queue with a completion queue element indicating a list of PRPs in the memory buffer in response to the subsequent read command.

Clause 9. The storage device of clause 8, wherein the list of PRPs is indicated in a status field of the completion queue element.

Clause 10. The storage device of any of clauses 1 to 9, wherein the controller is further configured to: receive a release command from the host indicating a release of the memory buffer; and free the memory buffer in response to the release command, wherein the host data is loaded in the memory buffer after the memory buffer is freed.

Clause 11. The storage device of any of clauses 1 to 10, wherein the memory buffer includes a plurality of bitmaps respectively indicating a status of each of a plurality of buffers within the memory buffer.

Clause 12. The storage device of clause 11, wherein the bitmaps include a first bitmap and a second bitmap respectively indicating free buffers and occupied buffers of the plurality of buffers, the first bitmap being write accessible to the controller and read accessible to the host, and the second bitmap being write accessible to the host and read accessible to the controller; wherein the occupied buffers indicated in the first bitmap include predicted host data and the occupied buffers indicated in the second bitmap include processed predicted host data.

Clause 13. The storage device of clause 12, wherein the controller is further configured to: update the first bitmap in response to a release command from the host indicating a release of one or more of the occupied buffers.

Clause 14. A storage device, comprising: non-volatile memory; and a controller configured to: obtain a bitmap indicating a status of a buffer in a memory buffer in host volatile memory, the memory buffer being accessible to a host and to the controller and being dedicated for predicted host data; predict, in response to a read command from the host indicating a logical address, a subsequent logical address to the logical address; read host data at the subsequent logical address from the non-volatile memory; and load the host data in the buffer in the memory buffer in response to the bitmap indicating the buffer is free.

Clause 15. The storage device of clause 14, wherein the bitmap indicates a plurality of free buffers and a plurality of occupied buffers in the memory buffer including the buffer, the bitmap being write accessible to the controller and read accessible to the host.

Clause 16. The storage device of clause 14 or clause 15, wherein the controller is further configured to: receive a release command from the host indicating a release of the buffer in the memory buffer; update the bitmap in response to the release command; and free the buffer in the memory buffer in response to the release, wherein the host data is loaded in the buffer in the memory buffer after the buffer is freed and the bitmap is updated.

Clause 17. The storage device of clause 16, wherein the release command includes a second bitmap indicating a plurality of occupied buffers in the memory buffer including the buffer, the second bitmap being write accessible to the host and read accessible to the controller.

Clause 18. A storage device, comprising: non-volatile memory; and a controller configured to: obtain a bitmap indicating a status of a buffer in a memory buffer in host volatile memory that is accessible to a host and to the controller, the memory buffer being dedicated for predicted host data; receive from the host a vendor-specific read command indicating a logical address; read host data associated with a predicted logical address that is subsequent to the logical address from the non-volatile memory in response to the vendor-specific read command; and load the host data in the buffer in the memory buffer in response to the bitmap indicating the buffer is free.

Clause 19. The storage device of clause 18, wherein the controller is further configured to: receive a vendor-specific release command from the host indicating a release of the buffer in the memory buffer; update the bitmap in response to the vendor-specific release command; and free the buffer in the memory buffer in response to the release, wherein the host data is loaded in the buffer in the memory buffer after the buffer is freed and the bitmap is updated.

Clause 20. The storage device of clause 18 or clause 19, wherein the controller is further configured to: receive from the host a second bitmap, the bitmap and the second bitmap respectively indicating a plurality of free buffers and a plurality of occupied buffers in the memory buffer including the buffer, and wherein the bitmap is write accessible to the controller and read accessible to the host, and the second bitmap is write accessible to the host and read accessible to the controller.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to all types of storage devices capable of storing data. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for.

What is claimed is:

1. A storage device, comprising:
non-volatile memory; and
a controller configured to:
receive from a host a read command indicating a logical address;
read host data associated with a predicted logical address that is subsequent to the logical address from the non-volatile memory in response to the read command;
load the host data in a memory buffer in host volatile memory that is accessible to the host and to the controller, the memory buffer being dedicated for predicted host data; and
subsequently receive from the host a subsequent read command indicating the predicted logical address, the subsequent read command lacking an address of a physical region page (PRP) specified in the read command for data transfer in response to the host data being loaded in the memory buffer.

2. The storage device of claim 1, wherein the memory buffer dedicated for the predicted host data is a read-look-ahead memory buffer (RMB) that is different than a host memory buffer (HMB).

3. The storage device of claim 1, wherein the controller is further configured to:
receive a vendor-specific command requesting the controller to allocate the memory buffer in a portion of the host volatile memory, wherein the host data is loaded after the memory buffer is allocated.

4. The storage device of claim 1, wherein the controller is further configured to:
predict a subsequent logical address to the logical address indicated in the read command, the predicted logical address being the subsequent logical address.

5. The storage device of claim 1, wherein the read command from the host indicates the predicted logical address.

6. The storage device of claim 1, wherein the controller is further configured to:
load, in the host volatile memory, a logical-to-physical (L2P) mapping of the predicted logical address to a physical address of the memory buffer.

7. The storage device of claim 1, wherein the controller is further configured to:
refrain from subsequently reading the host data associated with the predicted logical address from the non-volatile memory in response to reception of the subsequent read command from the host for the host data or in response to a lack of additional subsequent read commands from the host for the host data.

8. The storage device of claim 1, wherein the controller is further configured to:
update a completion queue with a completion queue element indicating a list of PRPs in the memory buffer in response to the subsequent read command.

9. The storage device of claim 8, wherein the list of PRPs is indicated in a status field of the completion queue element.

10. The storage device of claim 1, wherein the controller is further configured to:
receive a release command from the host indicating a release of the memory buffer; and
free the memory buffer in response to the release command, wherein the host data is loaded in the memory buffer after the memory buffer is freed.

11. The storage device of claim 1, wherein the memory buffer includes a plurality of bitmaps respectively indicating a status of each of a plurality of buffers within the memory buffer.

12. The storage device of claim 11,
wherein the bitmaps include a first bitmap and a second bitmap respectively indicating free buffers and occupied buffers of the plurality of buffers, the first bitmap being write accessible to the controller and read accessible to the host, and the second bitmap being write accessible to the host and read accessible to the controller;
wherein the occupied buffers indicated in the first bitmap include predicted host data and the occupied buffers indicated in the second bitmap include processed predicted host data.

13. The storage device of claim 12, wherein the controller is further configured to:
update the first bitmap in response to a release command from the host indicating a release of one or more of the occupied buffers.

14. A storage device, comprising:
non-volatile memory; and
a controller configured to:
obtain a bitmap indicating a status of a buffer in a memory buffer in host volatile memory, the memory buffer being accessible to a host and to the controller and being dedicated for predicted host data;
predict, in response to a read command from the host indicating a logical address, a subsequent logical address to the logical address;
read host data at the subsequent logical address from the non-volatile memory; and
load the host data in the buffer in the memory buffer in response to the bitmap indicating the buffer is free.

15. The storage device of claim 14, wherein the bitmap indicates a plurality of free buffers and a plurality of occupied buffers in the memory buffer including the buffer, the bitmap being write accessible to the controller and read accessible to the host.

16. The storage device of claim 14, wherein the controller is further configured to:
receive a release command from the host indicating a release of the buffer in the memory buffer;
update the bitmap in response to the release command; and
free the buffer in the memory buffer in response to the release, wherein the host data is loaded in the buffer in the memory buffer after the buffer is freed and the bitmap is updated.

17. The storage device of claim 16, wherein the release command includes a second bitmap indicating a plurality of occupied buffers in the memory buffer including the buffer, the second bitmap being write accessible to the host and read accessible to the controller.

18. A storage device, comprising:
non-volatile memory; and
a controller configured to:
obtain a bitmap indicating a status of a buffer in a memory buffer in host volatile memory that is accessible to a host and to the controller, the memory buffer being dedicated for predicted host data;
receive from the host a vendor-specific read command indicating a logical address;
read host data associated with a predicted logical address that is subsequent to the logical address from the non-volatile memory in response to the vendor-specific read command; and
load the host data in the buffer in the memory buffer in response to the bitmap indicating the buffer is free.

19. The storage device of claim 18, wherein the controller is further configured to:
receive a vendor-specific release command from the host indicating a release of the buffer in the memory buffer;
update the bitmap in response to the vendor-specific release command; and
free the buffer in the memory buffer in response to the release, wherein the host data is loaded in the buffer in the memory buffer after the buffer is freed and the bitmap is updated.

20. The storage device of claim 18, wherein the controller is further configured to:
receive from the host a second bitmap, the bitmap and the second bitmap respectively indicating a plurality of free buffers and a plurality of occupied buffers in the memory buffer including the buffer, and wherein the bitmap is write accessible to the controller and read accessible to the host, and the second bitmap is write accessible to the host and read accessible to the controller.

* * * * *